US012734764B2

(12) United States Patent
Autry et al.

(10) Patent No.: US 12,734,764 B2
(45) Date of Patent: *Sep. 15, 2026

(54) METHOD AND APPARATUS FOR BONDING STRINGERS TO A FUSELAGE SKIN

(71) Applicant: The Boeing Company, Chicago, IL (US)

(72) Inventors: Byron J. Autry, Charleston, SC (US); Paul G. Werntges, Charleston, SC (US); Samuel J. Knutson, Charleston, SC (US); Gregory Hickman, Charleston, SC (US); Alice R. Arnold, Charleston, SC (US)

(73) Assignee: The Boeing Company, Arlington, VA (US)

( * ) Notice: Subject to any disclaimer, the term of this patent is extended or adjusted under 35 U.S.C. 154(b) by 212 days.

This patent is subject to a terminal disclaimer.

(21) Appl. No.: 18/645,525

(22) Filed: Apr. 25, 2024

(65) Prior Publication Data

US 2024/0269937 A1 Aug. 15, 2024

Related U.S. Application Data

(63) Continuation of application No. 17/502,519, filed on Oct. 15, 2021, now Pat. No. 11,981,089.

(51) Int. Cl.
*B29C 65/78* (2006.01)
*B29C 65/24* (2006.01)
(Continued)

(52) U.S. Cl.
CPC ........ *B29C 65/7841* (2013.01); *B29C 65/242* (2013.01); *B29C 65/7802* (2013.01);
(Continued)

(58) Field of Classification Search
CPC .............. B29C 65/7841; B29C 65/242; B29C 65/7802; B29C 65/7855; B29C 65/4815;
(Continued)

(56) References Cited

U.S. PATENT DOCUMENTS 10,500,736 B2 12/2019 Hantzschel et al.
11,981,089 B2 * 5/2024 Autry ................ B29C 66/82421
(Continued)

FOREIGN PATENT DOCUMENTS

EP 3747637 A1 12/2020
WO 2014088704 A2 6/2014

OTHER PUBLICATIONS

European Patent Office, "Communication pursuant to Article 94(3) EPC," App. No. 22 192 564.7 (May 28, 2025).

*Primary Examiner* — S. Behrooz Ghorishi
(74) *Attorney, Agent, or Firm* — Walters & Wasylyna LLC

(57) ABSTRACT

A joining system includes a holding fixture assembly configured to hold a fuselage skin. The stringers are temporarily attached to the fuselage skin. The joining system includes an upper beam assembly including an upper beam and a lower beam assembly. The lower beam assembly includes a lower beam and at least one lower heating element. The holding fixture assembly is coupled to the upper beam assembly. The holding fixture assembly is coupled to the lower beam assembly. The upper beam is movable relative to the lower beam to clamp the at least one of the plurality of stringers and the fuselage skin together prior to and during welding.

20 Claims, 15 Drawing Sheets

(51) Int. Cl.
*B29K 101/12* (2006.01)
*B29L 31/30* (2006.01)
*B64C 1/12* (2006.01)
*B64F 5/10* (2017.01)

(52) U.S. Cl.
CPC .................. *B64C 1/12* (2013.01); *B64F 5/10* (2017.01); *B29K 2101/12* (2013.01); *B29L 2031/3082* (2013.01)

(58) Field of Classification Search
CPC ... B29C 65/5057; B29C 66/532; B29C 66/54; B29C 66/61; B29C 66/81459; B29C 66/81463; B29C 66/82421; B29C 66/8322; B29C 70/32; B29C 65/26; B29C 65/32; B29C 65/18; B64C 1/12; B64C 1/064; B64F 5/10; B29K 2101/12; B29L 2031/3082
See application file for complete search history.

(56) References Cited

U.S. PATENT DOCUMENTS

2010/0038024 A1 2/2010 Brandt
2015/0298388 A1 10/2015 Wong et al.
2017/0066143 A1 3/2017 Hantzschel et al.

* cited by examiner 12
12
173
108
104
142
142
173
106
110
12
10
12

METHOD AND APPARATUS FOR BONDING STRINGERS TO A FUSELAGE SKIN

CROSS-REFERENCE TO RELATED APPLICATIONS

This application is a continuation of U.S. patent application Ser. No. 17/502,519, filed on Oct. 15, 2021, which is hereby incorporated by reference in its entirety.

TECHNICAL FIELD

The present disclosure generally relates to a joining system and method, and more particularly, to a method and apparatus for bonding stringers to a fuselage skin.

BACKGROUND

In aircrafts, stringers may be bonded to fuselage skins. It is therefore desirable to develop an apparatus and a method for bonding stringers to a fuselage skin. Current composite fabrication methods require co-curing of stringers to the skin or fastening of the stringer to the skin panel. Accordingly, those skilled in the art continue with research and development efforts in the field of composite manufacturing.

SUMMARY

The present disclosure describes a joining system for bonding stringers to a fuselage skin through conductive thermoplastic welding. In an aspect of the present disclosure the joining system includes a holding fixture assembly configured to hold a fuselage skin. At least one of the stringers is temporarily attached to the fuselage skin. The joining system further includes an upper beam assembly including an upper beam, and a lower beam assembly including a lower beam and at least one lower heating element. The holding fixture assembly is coupled to the upper beam assembly, and the holding fixture assembly is coupled to the lower beam assembly. The upper beam is movable relative to the lower beam to clamp at least one of the plurality of stringers and the fuselage skin together prior to and during the welding.

In an aspect of the present disclosure, each of the plurality of stringers includes at least one flange. The lower heating element may be a welder. The welder is configured to weld fuselage skin to the entire flange all at once.

In an aspect of the present disclosure, the lower heating element is configured to apply heat to the fuselage skin and the at least one of the plurality of stringers to melt a thermoplastic film disposed between the fuselage skin and the at least one of the plurality of stringers to bond at least one of the plurality of stringers to the fuselage skin.

In an aspect of the present disclosure, the upper beam assembly includes a plurality of pressure feet coupled to the upper beam. Each of the plurality of pressure feet is configured to apply pressure to the fuselage skin and the plurality of stringers. The upper beam assembly further includes an inflatable bladder coupled to each of the plurality of pressure feet. The holding fixture assembly is configured to orient the fuselage skin and the plurality of stringers in a normal orientation relative to the upper beam and the lower beam. Each of plurality of pressure feet is movable relative to the lower beam to hold at least one of the plurality of stringers against the fuselage skin. Each of plurality of pressure feet is configured to compress at least one of the plurality of stringers and the fuselage skin together using the inflatable bladder prior to and during the conductive thermoplastic welding. The welder is configured to conduct a conductive thermoplastic welding process.

In an aspect of the present disclosure, the upper beam assembly further includes a plurality of pneumatic cylinders each coupled to the upper beam and a respective one of the plurality of pressure feet.

In an aspect of the present disclosure, the upper beam assembly further includes a plurality of heim joints each coupled between a respective one of the plurality of pneumatic cylinders and the respective one of the plurality of pressure feet.

In an aspect of the present disclosure, the joining system further includes a first end support and a second end support. The upper beam includes a first beam end and a second beam end opposite the first beam end. The first end support is directly coupled to the first beam end, and the second end support is directly coupled to the upper beam.

In an aspect of the present disclosure, each of the plurality of pressure feet defines a bladder cavity sized to receive the inflatable bladder. The bladder cavity of each of the plurality of pressure feet is aligned to receive the inflatable bladder in a longitudinal direction.

In an aspect of the present disclosure, the upper beam assembly further includes a contact shim disposed between the inflatable bladder and a flange of one of the plurality of stringers.

In an aspect of the present disclosure, each of the upper beam, the lower beam, and the inflatable bladder is elongated along the longitudinal direction. The lower beam assembly includes a first platen plate and a second platen plate disposed on the lower beam. The first platen plate is spaced apart from the second platen plate along a transverse direction. The transverse direction is perpendicular to the longitudinal direction. Each of the first platen plate and the second platen plate is configured to directly contact the fuselage skin to facilitate bonding the fuselage skin to one of the plurality of stringers.

In an aspect of the present disclosure, the lower heating element may be referred to as a first heating element. The lower beam assembly further includes a second heating element to facilitate bonding the fuselage skin to one of the plurality of stringers. The first heating element is disposed under the first platen plate. The first heating element is in direct contact with the first platen plate to facilitate heat transfer from the first heating element to the first platen plate, the second heating element is disposed under the second platen plate. The second heating element is in direct contact with the second platen plate to facilitate heat transfer from the second heating element to the second platen plate.

In an aspect of the present disclosure, the lower beam assembly includes a thermally insulative block at least partially disposed under the first heating element and the second heating element to hinder heat transfer from the first heating element and the second heating element to the lower beam. The thermally insulative block is disposed on the lower beam.

In an aspect of the present disclosure, the upper beam assembly further includes an upper heating element coupled to the upper beam. The upper heating element is disposed between the inflatable bladder and the flange of the at least one of the plurality of stringers to facilitate bonding one of the plurality of stringers to the fuselage skin.

In an aspect of the present disclosure, the joining system includes a first ring and a second ring collectively configured to hold at least a portion of the fuselage skin. The first ring and the second ring are rotatable relative to the first end support and the second end support, respectively, about an axis of rotation to rotate the fuselage skin relative to the upper beam and the lower beam. The joining system further comprises servo motors coupled to the first ring and the second ring to rotate the first ring and the second ring about the axis of rotation.

In an aspect of the present disclosure, each of the first ring and the second ring includes a plurality of clamps. Each of the plurality of clamps has a closed configuration to hold the fuselage skin and an open configuration to release the fuselage skin.

In an aspect of the present disclosure, the lower beam assembly further includes a gimbal supporting the lower beam. The lower beam assembly further includes at least one biasing member coupled to the lower beam to maintain the lower beam in a neutral position.

In an aspect of the present disclosure, the lower beam assembly further includes at least one biasing member coupled between the lower beam and the thermally insulative block to permit relative movement of the thermally insulative block relative to the lower beam.

In an aspect of the present disclosure, the upper beam assembly further includes a plurality of hydraulic cylinders each coupled to the upper beam and a respective one of the plurality of pressure feet.

In an aspect of the present disclosure, the upper beam assembly further includes a plurality of servo motors each coupled between the upper beam and a respective one of the plurality of pressure feet.

In an aspect of the present disclosure, the upper beam is substantially stiff to react a necessary pressure required to join one of the plurality of stringers to the fuselage skin while minimizing deflection of the at least one of the plurality of stringers and the fuselage skin.

In an aspect of the present disclosure, the lower beam assembly comprises at least one thermally insulative block disposed on the lower beam. The lower heating element is disposed on the at least one thermally insulative block. The lower beam assembly further includes a plurality of platen plates disposed on the at least one lower heating element.

In an aspect of the present disclosure, the holding fixture assembly includes a plurality of rings and a plurality of longitudinal members coupled to the plurality of rings. The plurality of rings and the plurality of longitudinal members hold the fuselage skin in an approximately nominal condition. The joining system further includes a plurality of cradles coupled to the plurality of rings to rotate the plurality of rings.

In an aspect of the present disclosure, the upper beam assembly further includes a plurality of actuators each coupled to the upper beam and a respective one of the plurality of pressure feet. Each of plurality of pressure feet is movable relative to the lower beam upon actuation of the plurality of actuators.

In an aspect of the present disclosure, the joining system includes a controller programmed to actuate the plurality of actuators, pressurize the inflatable bladder, and regulate heat applied by the at least one lower heating element.

In an aspect of the present disclosure, the joining system further includes a first end support and a second end support. The upper beam includes a first beam end and a second beam end opposite the first beam end. The first end support is coupled at the first beam end. The second end support is coupled at the upper beam. Each of the first end support and the second end support includes a guide and a mechanical linear actuator to move the upper beam in a vertical direction relative to the lower beam.

In an aspect of the present disclosure, the lower beam assembly includes at least one thermally insulative block disposed on the lower beam, at least one lower heating element disposed on the at least one thermally insulative block, and a plurality of platen plates disposed on the at least one lower heating element. The lower beam assembly further includes a pivot point on the lower beam. The lower heating element and the plurality of platen plates are attached to the pivot point to provide a rotational axis, thereby allowing the at least one lower heating element and the plurality of platen plates to remain approximately normal to a surface of the fuselage skin.

In an aspect of the present disclosure, the joining system further includes a first end support and a second end support. The upper beam includes a first beam end and a second beam end opposite the first beam end. The first end support is coupled at the first beam end. The second end support is coupled at the upper beam. Each of the first end support and the second end support includes a guide and a mechanical linear actuator to move the upper beam in a vertical direction relative to the lower beam.

In an aspect of the present disclosure, the fuselage skin and/or the stringers may be wholly or partly made of a thermoset material and/or a thermoplastic material.

In an aspect of the present disclosure, the lower heating element is configured to apply heat to the fuselage skin and the plurality of stringers.

In an aspect of the present disclosure, conductive heating may be used for welding the stringers to the fuselage skin.

In an aspect of the present disclosure, conductive heating of the fuselage skin and at least one of the plurality of stringers is used for conductive thermoplastic welding the at least one of the plurality of stringers to the fuselage skin The present disclosure also describes a method of joining a stringer to a fuselage skin. In an aspect of the present disclosure, the method includes positioning a flange of the stringer and the fuselage skin in a clamp up device, clamping the flange of the stringer and the fuselage skin together, and welding the flange of the stringer to the fuselage skin.

In an aspect of the present disclosure, the clamp up device includes an upper beam and a lower beam. The upper beam is part of an upper beam assembly. The upper beam assembly further includes a plurality of pressure feet coupled to the upper beam and an inflatable bladder coupled to each of the plurality of pressure feet. Clamping the flange of the stringer and the fuselage skin together includes moving at least one of the plurality of pressure feet toward the lower beam until the inflatable bladder is proximate to the flange of the stringer to bond the stringer to the fuselage skin. Further, clamping the flange of the stringer and the fuselage skin together includes inflating the inflatable bladder. During welding, the entire flange is welded to the fuselage skin all at once.

In an aspect of the present disclosure, the method further includes attaching the fuselage skin to a first ring and a second ring of the joining system before moving the at least one of the plurality of pressure feet toward the lower beam. Positioning the flange of the stringer and the fuselage skin between the upper beam and the lower beam includes rotating the first ring and the second ring after attaching the fuselage skin and the first ring and the second ring until the flange of the stringer is positioned between the upper beam and the lower beam.

In an aspect of the present disclosure, the upper beam assembly further includes a plurality of pneumatic cylinders each coupled to the upper beam and the plurality of pressure feet. Moving at least one of the plurality of pressure feet toward the lower beam includes actuating at least one of the plurality of pneumatic cylinders to move the at least one of the plurality of pressure feet toward the lower beam.

In an aspect of the present disclosure, the lower beam is part of a lower beam assembly. The lower beam assembly further includes a first heating element and a second heating element each coupled to the lower beam. The method further includes activating the first heating element and the second heating element to heat the flange of the stringer and the fuselage skin.

In an aspect of the present disclosure, the upper beam assembly further includes an upper heating element coupled to the upper beam. The method further includes activating the upper heating element to heat the flange of the stringer and the fuselage skin.

In an aspect of the present disclosure, the upper beam assembly further incudes a plurality of hydraulic cylinders each coupled to the upper beam and the plurality of pressure feet. Moving the at least one of the plurality of pressure feet toward the lower beam includes actuating at least one of the plurality of hydraulic cylinders to move the at least one of the plurality of pressure feet toward the lower beam.

In an aspect of the present disclosure, the upper beam assembly further includes a plurality of servo motors each coupled between the upper beam and the plurality of pressure feet. Moving the at least one of the plurality of pressure feet toward the lower beam includes activating at least one of the plurality of servo motors to move the at least one of the plurality of pressure feet toward the lower beam.

In an aspect of the present disclosure, the welding includes performing a conductive thermoplastic welding process. The conductive thermoplastic welding process includes applying heat to the flange and the fuselage skin in accordance with a predetermined heating plan to melt a thermoplastic film that is disposed between the fuselage skin and the flange to bond the at least one of the plurality of stringers to the fuselage skin.

In an aspect of the present disclosure, a portion of an aircraft is assembled according to the method described above.

In an aspect of the present disclosure, a method for joining at least one stringer to a fuselage skin includes: a) attaching at least one stringer to the fuselage skin, wherein each of the stringer includes a stringer body and at least one flange extending from the stringer body; b) welding an entirety of the flange into the fuselage skin all at once.

In an aspect of the present disclosure, the method further includes: c) transferring the plurality of stringers and the fuselage skin to a joining cell and d) rotating the fuselage skin and with the stringer until the stringer is located between an upper beam and a lower beam. The lower beam is part of a lower beam assembly. The upper beam is part of a plurality of an upper beam assembly. The upper beam assembly includes a plurality of pressure feet coupled to the upper beam and an inflatable bladder coupled to the plurality of pressure feet.

In an aspect of the present disclosure, the method further includes: c) engaging the lower beam assembly with the fuselage skin and f) moving the upper beam toward the lower beam until at least one of the plurality of pressure feet of the upper beam assembly is proximate to the flange.

In an aspect of the present disclosure, the method further includes: g) moving the plurality of pressure feet toward the flange until each of the plurality of pressure feet is in contact with the flange and h) pressurizing the inflatable bladder.

In an aspect of the present disclosure, the method further includes: i) applying heat to the flange and the fuselage skin in accordance with a predetermined heating plan to melt a thermoplastic film that is disposed between the fuselage skin and the flange to bond the at least one of the plurality of stringers to the fuselage skin.

In an aspect of the present disclosure, the method includes: j) cooling the flange and the fuselage skin and k) moving the plurality of pressure feet away from the lower beam.

In an aspect of the present disclosure, the method includes: l) moving the upper beam away from the fuselage skin to allow further rotation of the fuselage skin and m) moving the lower beam away from the fuselage skin to allow further rotation of the fuselage skin.

In an aspect of the present disclosure, the method further includes repeating steps b, c, d, e, f, g, h, i, j, k, l, and m to bond another stringer (i.e., a second stringer) to the fuselage skin.

In an aspect of the present disclosure, clamping the stringer to the fuselage skin includes inserting temporary fasteners through stringer and the fuselage skin.

In an aspect of the present disclosure, attaching the plurality of stringers to the fuselage skin includes inserting thermoplastic rivets through the stringer and the fuselage skin.

In an aspect of the present disclosure, moving the upper beam toward the lower beam until one of the pressure feet of the upper beam assembly is proximate to the flange includes moving the upper beam toward the lower beam until at least one of the plurality of pressure feet is about 0.25 inches from the flange.

In an aspect of the present disclosure, the upper beam assembly further includes a plurality of actuators each coupled to the upper beam and a respective one of the plurality of pressure feet. Each of plurality of pressure feet is movable relative to the lower beam upon actuation of the plurality of actuators. In this method, moving the plurality of pressure feet toward the flange includes actuating the plurality of actuators that are coupled to the upper beam.

In an aspect of the present disclosure, moving the plurality of pressure feet away from the lower beam includes deactivating the plurality of actuators.

In an aspect of the present disclosure, pressurizing the inflatable bladder includes inflating the inflatable bladder with air until the inflatable is fully inflated.

In an aspect of the present disclosure, clamping the stringer to the fuselage includes inserting at least one temporary fastener through the stringer and the fuselage skin to temporarily attach the stringer to the fuselage skin. For example, the temporary fastener may be inserted through the flange of the stringer and the fuselage skin.

In an aspect of the present disclosure, the method further includes removing the temporary fastener from the stringer and the fuselage skin after welding the entire flange to the fuselage skin all at once.

In an aspect of the present disclosure, a method of joining a stringer to a fuselage skin includes: positioning a flange of the stringer and the fuselage skin between a clamp up device; clamping the flange of the stringer and the fuselage skin together; and welding an entirety of a length of the flange of the stringer that is clamped to the fuselage skin all at once.

In an aspect of the present disclosure, the method further includes a thermoplastic film between the flange of the stringer and the fuselage skin.

In an aspect of the present disclosure, a joining system includes a holding fixture assembly configured to hold a fuselage skin. The stringer is temporarily attached to the fuselage skin. The stringer includes at least one flange. The joining system further includes an upper beam assembly including an upper beam and a lower beam assembly. The lower beam assembly includes a lower beam and at least one lower heating element. The holding fixture assembly is coupled to the upper beam assembly. The holding fixture assembly is coupled to the lower beam assembly. The upper beam is movable relative to the lower beam to clamp the stringer and the fuselage skin together prior to and during welding. The lower heating element is configured to weld an entirety of the at least one flange of the at least one stringer all at once to the fuselage skin.

In an aspect of the present disclosure, the upper beam assembly includes a plurality of pressure feet coupled to the upper beam. Each of the plurality of pressure feet is configured to apply pressure to the fuselage skin and the at least one stringer. The upper beam assembly further includes an inflatable bladder coupled to each of the plurality of pressure feet. The holding fixture assembly is configured to orient the fuselage skin and the at least one stringer in a normal orientation relative to the upper beam and the lower beam. Each of plurality of pressure feet is movable relative to the lower beam to hold the stringer against the fuselage skin. Each of plurality of pressure feet is configured to compress the at least one stringer and the fuselage skin together using the inflatable bladder prior to and during the welding. The welder is configured to conduct a conductive thermoplastic welding process.

In an aspect of the present disclosure, the upper beam assembly further includes a plurality of pneumatic cylinders each coupled to the upper beam and a respective one of the plurality of pressure feet.

In an aspect of the present disclosure, the upper beam assembly further includes a plurality of heim joints each coupled between a respective one of the plurality of pneumatic cylinders and the respective one of the plurality of pressure feet.

In an aspect of the present disclosure, the joining system further includes a first end support and a second end support. The upper beam includes a first beam end and a second beam end opposite the first beam end. The first end support is directly coupled to the first beam end, and the second end support is directly coupled to the upper beam.

In an aspect of the present disclosure, each of the plurality of pressure feet defines a bladder cavity sized to receive the inflatable bladder. The bladder cavity of each of the plurality of pressure feet is aligned to receive the inflatable bladder in a longitudinal direction.

In an aspect of the present disclosure, the upper beam assembly further includes a contact shim disposed between the inflatable bladder and the flange of one of the plurality of stringers.

In an aspect of the present disclosure, each of the upper beam, the lower beam, and the inflatable bladder is elongated along the longitudinal direction. The lower beam assembly includes a first platen plate and a second platen plate disposed on the lower beam. The first platen plate is spaced apart from the second platen plate along a transverse direction. The transverse direction is perpendicular to the longitudinal direction. Each of the first platen plate and the second platen plate is configured to directly contact the fuselage skin to facilitate bonding the fuselage skin to the at least one stringer.

In an aspect of the present disclosure, the lower heating element is configured to apply heat to the fuselage skin and the at least one of the at least one stringer to melt a thermoplastic film disposed between the fuselage skin and the stringer to bond the stringer to the fuselage skin. The lower heating element is a first heating element. The lower beam assembly further includes a second heating element to facilitate bonding the fuselage skin to one of the plurality of stringers. The first heating element is disposed under the first platen plate. The first heating element is in direct contact with the first platen plate to facilitate heat transfer from the first heating element to the first platen plate. The second heating element is disposed under the second platen plate. The second heating element is in direct contact with the second platen plate to facilitate heat transfer from the second heating element to the second platen plate.

In an aspect of the present disclosure, the lower beam assembly includes a thermally insulative block at least partially disposed under the first heating element and the second heating element to hinder heat transfer from the first heating element and the second heating element to the lower beam. The thermally insulative block is disposed on the lower beam.

In an aspect of the present disclosure, the upper beam assembly further comprises an upper heating element coupled to the upper beam. The upper heating element is disposed between the inflatable bladder and the flange of the at least one stringer to facilitate bonding the at least one stringer to the fuselage skin.

In an aspect of the present disclosure, the joining system further includes a first ring and a second ring collectively configured to hold at least a portion of the fuselage skin. The first ring and the second ring are rotatable relative to the first end support and the second end support, respectively, about an axis of rotation to rotate the fuselage skin relative to the upper beam and the lower beam. The joining system further includes servo motors coupled to the first ring and the second ring to rotate the first ring and the second ring about the axis of rotation.

In an aspect of the present disclosure, each of the first ring and the second ring includes a plurality of clamps. Each of the clamps has a closed configuration to hold the fuselage skin and an open configuration to release the fuselage skin.

In an aspect of the present disclosure, the lower beam assembly further includes a gimbal supporting the lower beam. The lower beam assembly further includes at least one biasing member coupled to the lower beam to maintain the lower beam in a neutral position.

In an aspect of the present disclosure, the biasing member coupled between the lower beam and the thermally insulative block to permit relative movement of the thermally insulative block relative to the lower beam.

In an aspect of the present disclosure, the upper beam assembly further includes a plurality of hydraulic cylinders each coupled to the upper beam and a respective one of the plurality of pressure feet.

In an aspect of the present disclosure, the upper beam assembly further includes a plurality of servo motors each coupled between the upper beam and a respective one of the plurality of pressure feet.

In an aspect of the present disclosure, the upper beam is substantially stiff to react a necessary pressure required to join the at least one stringer to the fuselage skin while minimizing deflection of the stringer and the fuselage skin.

In an aspect of the present disclosure, the lower beam assembly includes at least one thermally insulative block disposed on the lower beam. The lower heating element is disposed on the thermally insulative block. The lower beam assembly further includes a plurality of platen plates disposed on the at least one lower heating element.

In an aspect of the present disclosure, the holding fixture assembly includes a plurality of rings and a plurality of longitudinal members coupled to the plurality of rings. The plurality of rings and the plurality of longitudinal members hold the fuselage skin in an approximately nominal condition, and the joining system further includes a plurality of cradles coupled to the plurality of rings to rotate the plurality of rings.

In an aspect of the present disclosure, the upper beam assembly further includes a plurality of actuators each coupled to the upper beam and a respective one of the plurality of pressure feet. Each of the plurality of pressure feet is movable relative to the lower beam upon actuation of the plurality of actuators.

In an aspect of the present disclosure, the joining system further includes a controller programmed to actuate the plurality of actuators, pressurize the inflatable bladder, and regulate heat applied by the at least one lower heating element.

In an aspect of the present disclosure, joining system further includes a first end support and a second end support. The upper beam includes a first beam end and a second beam end opposite the first beam end. The first end support is coupled at the first beam end. The second end support is coupled at the upper beam. Each of the first end support and the second end support includes a guide and a mechanical linear actuator to move the upper beam in a vertical direction relative to the lower beam.

In an aspect of the present disclosure, the lower beam assembly includes at least one thermally insulative block disposed on the lower beam, at least one lower heating element disposed on the at least one thermally insulative block, and a plurality of platen plates disposed on the at least one lower heating element. The lower beam assembly further includes a pivot point on the lower beam. The lower heating element and the plurality of platen plates are attached to the pivot point to provide a rotational axis, thereby allowing the at least one lower heating element and the plurality of platen plates to remain approximately normal to a surface of the fuselage skin.

In an aspect of the present disclosure, the joining system includes a first end support and a second end support. The upper beam includes a first beam end and a second beam end opposite the first beam end. The first end support is coupled at the first beam end. The second end support is coupled at the upper beam.

In an aspect of the present disclosure, the fuselage skin includes at least of one of a thermoset material or a thermoplastic material.

In an aspect of the present disclosure, the stringer includes at least one of a thermoset material or a thermoplastic material.

In aspect of the present disclosure, the lower heating element is configured to apply heat to the fuselage skin and the stringer.

In an aspect of the present disclosure, conductive heating of the fuselage skin and at least one of the stringer is used for conductive thermoplastic welding stringer to the fuselage skin.

In an aspect of the present disclosure, a method of joining a stringer to a fuselage ski includes: placing a thermoplastic film between at least one flange of the stringer and the fuselage skin; clamping the at least one flange of the stringer and the fuselage skin together; and welding the at least one flange of the stringer to the fuselage skin. Welding the flange of the stringer to the fuselage skin includes heating the thermoplastic film that is disposed between the at least one flange of the at least one stringer and the fuselage skin.

In an aspect of the present disclosure, heating the thermoplastic film that is disposed between the flange of the stringer and the fuselage skin includes melting the thermoplastic film that is disposed between the at least one flange of the at least one stringer and the fuselage skin.

In an aspect of the present disclosure, the flange includes a thermoset material.

In an aspect of the present disclosure, the fuselage skin includes a thermoset material.

In an aspect of the present disclosure, clamping the flange of the stringer and the fuselage skin together includes moving at least one of a plurality of pressure feet of an upper beam assembly toward a lower beam of a lower beam assembly until an inflatable bladder of the upper beam assembly is proximate to the at least one flange of the stringer. Further, clamping the flange of the stringer and the fuselage skin together includes inflating the inflatable bladder. Moreover, welding the flange of the stringer to the fuselage skin includes welding an entirety of the flange to the fuselage skin all at once.

In an aspect of the present disclosure, the method further includes attaching the fuselage skin to a first ring and a second ring of a joining system before moving the at least one of the plurality of pressure feet toward the lower beam and positioning the flange of the stringer and the fuselage skin between an upper beam of the upper beam assembly and the lower beam Positioning the flange of the stringer and the fuselage skin between an upper beam of the upper beam assembly and the lower beam includes rotating the first ring and the second ring after attaching the fuselage skin and the first ring and the second ring until the flange of the stringer is positioned between the upper beam and the lower beam.

In an aspect of the present disclosure, moving at least one of the pressure feet toward the lower beam includes actuating at least one of a plurality of pneumatic cylinders that is coupled to the upper beam to move the at least one of the plurality of pressure feet toward the lower beam.

In an aspect of the present disclosure, the method further includes activating a first heating element of a lower beam assembly and a second heating element of a lower beam assembly to heat the at least one flange of the stringer and the fuselage skin. Each of the first heating element and the second heating element is coupled to the lower beam.

In an aspect of the present disclosure, the method further includes activating an upper heating element of the upper beam assembly to heat the flange of the stringer and the fuselage skin.

In an aspect of the present disclosure, moving the at least one of the pressure feet toward the lower beam includes actuating at least one of a plurality of hydraulic cylinders of the upper beam assembly to move one or more of the pressure feet toward the lower beam.

In an aspect of the present disclosure, moving one or more of the pressure feet toward the lower beam includes activating at least one of a plurality of servo motors of the upper beam assembly to move the at least one of the plurality of pressure feet toward the lower beam.

In an aspect of the present disclosure, welding the flange of the stringer to the fuselage skin includes performing a conductive thermoplastic welding process.

In an aspect of the present disclosure, the conductive thermoplastic welding process includes applying heat to the flange and the fuselage skin in accordance with a predetermined heating plan to melt the thermoplastic film that is disposed between the fuselage skin and the at least one flange to bond the stringer to the fuselage skin.

The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
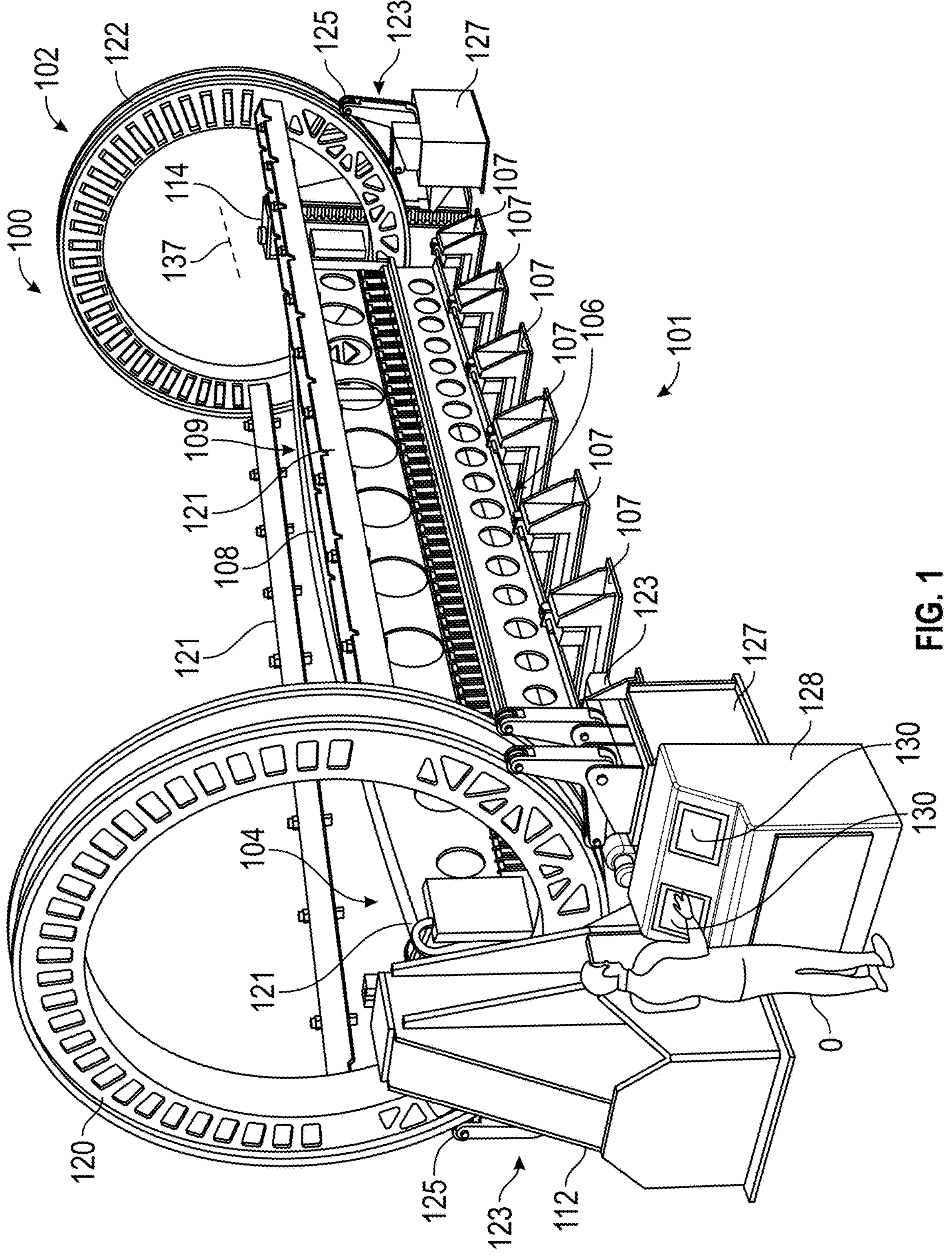
FIG. 1 is a schematic, perspective view of a joining system for bonding stringers to a fuselage skin.
Figure 2:
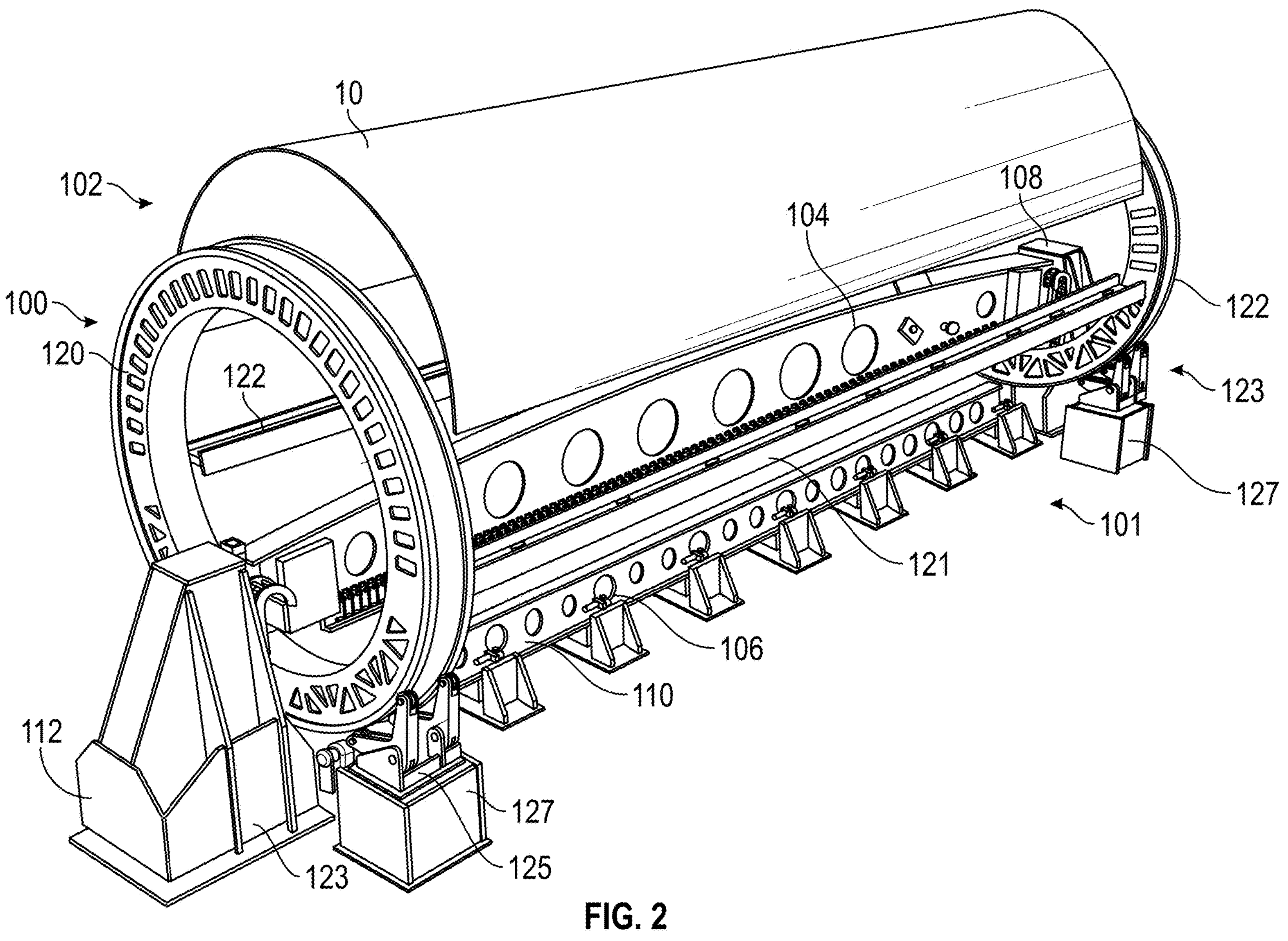
FIG. 2 is a schematic, perspective view of the joining system of FIG. 1, showing a fuselage skin being positioned on the joining system.
Figure 3:
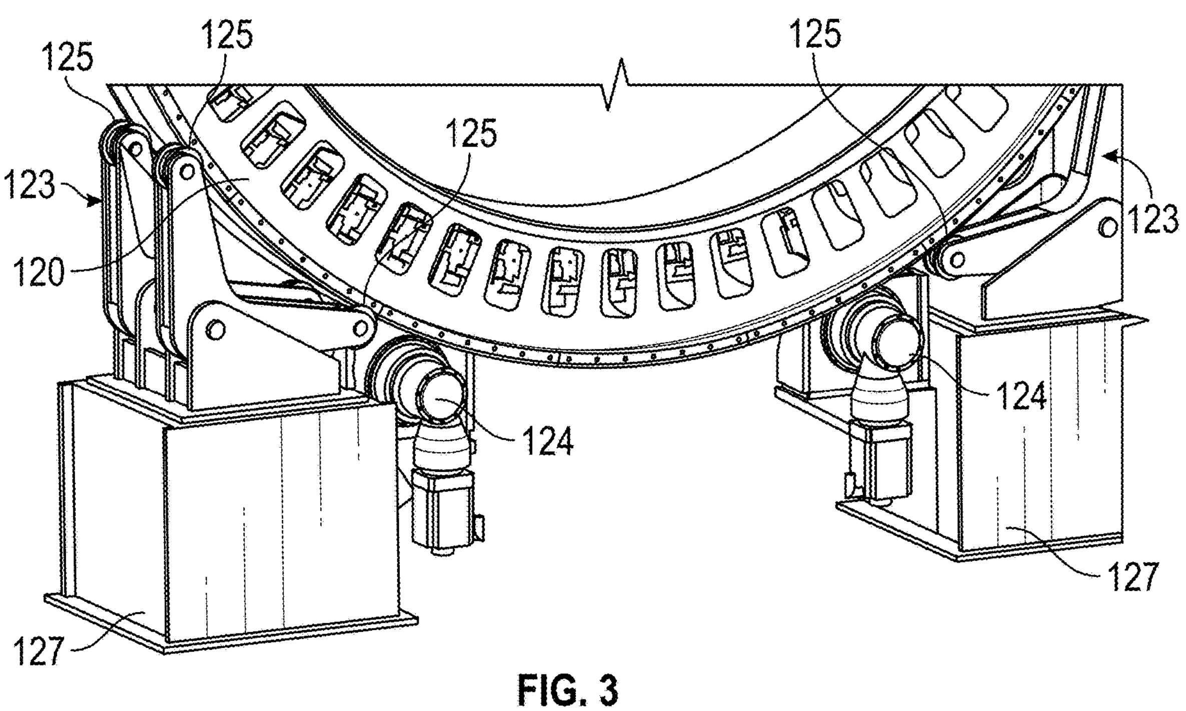
FIG. 3 is a schematic, perspective rear view of a portion of a holding fixture assembly of the joining system of FIG. 1, showing electric motors coupled to one of the rings of the holding fixture assembly.
Figure 4:
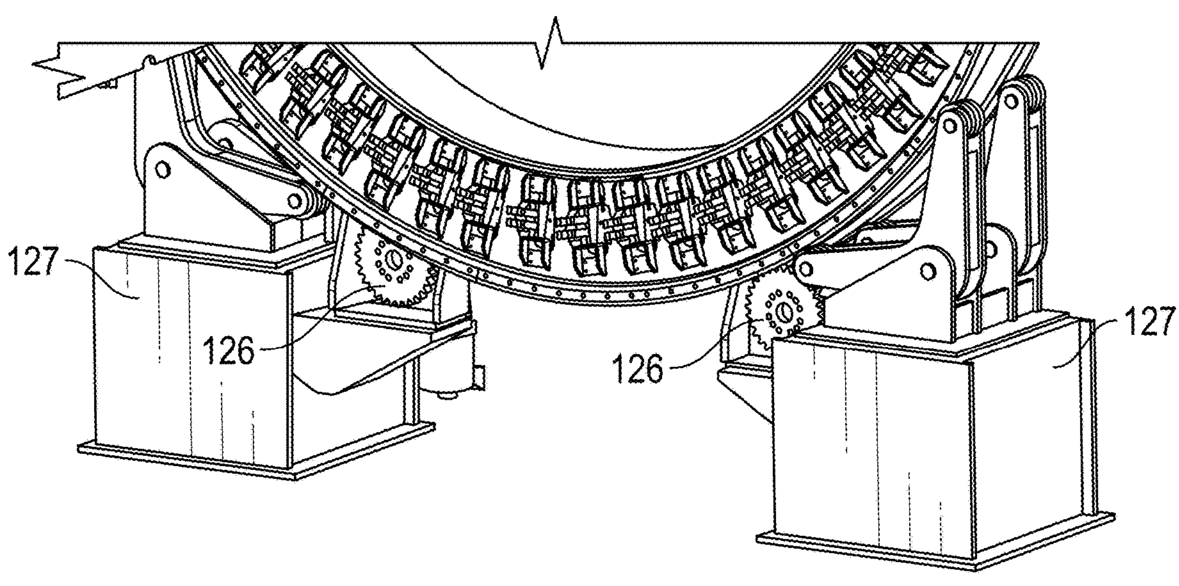
FIG. 4 is a schematic, perspective front view of a portion of the holding fixture assembly of the joining system of FIG. 1, showing electric motors coupled to one of the rings of the holding fixture assembly.
Figure 8:
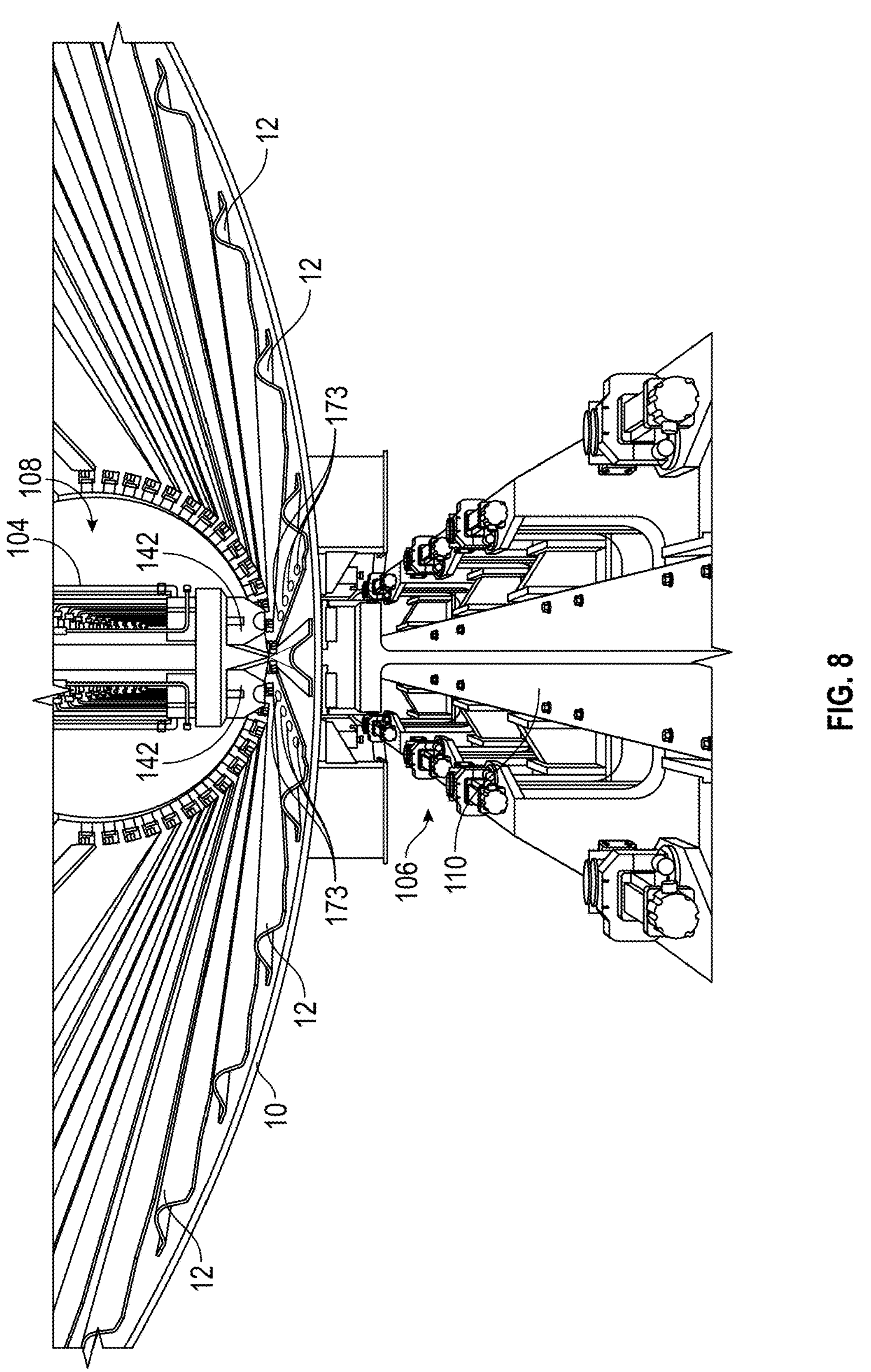
FIG. 8 is a schematic, front view of a portion of the joining system of FIG. 1, showing the upper beam assembly, the lower beam assembly and the fuselage skin disposed between the lower beam assembly and the upper beam assembly.

With reference to FIGS. 1 and 2, a joining system 100 includes a holding fixture assembly 102 configured to hold a fuselage skin 10. In addition to the holding fixture assembly 102, the joining system 100 includes an upper beam assembly 104 and a lower beam assembly 106 that are movable relative to each other. The holding fixture assembly 102 is coupled to the upper beam assembly 104, and the holding fixture assembly 102 is coupled to the lower beam assembly 106. The upper beam assembly 104 and the lower beam assembly 106 are used to clamp the fuselage skin 10 and one or more stringers 12 (FIG. 8). The upper beam assembly 104 includes an upper beam 108 configured to move relative to the lower beam assembly 106 to clamp the fuselage skin 10 and the stringers 12 together. To accomplish this clamping process, the upper beam 108 is substantially stiff to react a necessary pressure required to join the stringer 12 to the fuselage skin 10 while minimizing deflection of the stringer 12 and the fuselage skin 10. Due to the stiffness of the upper beam 108, the upper beam assembly 104 and the lower beam assembly 106 can effectively clamp the fuselage skin 10 and the stringers 12 together during the welding process. The lower beam assembly 106 includes a lower beam 110 configured to move relative to the upper beam 108. The lower beam 110 and the upper beam 108 jointly form a clamp up device 109. The holding fixture assembly 102 may include a plurality of mounts 107 coupled along the lower beam 110 to support the lower beam 110. In addition to the mounts 107, the holding fixture assembly 102 includes a first end support 112 and a second end support 114. The upper beam 108 includes a first beam end 116 and a second beam end 118 opposite the first beam end 116. The first end support 112 may be directly or indirectly coupled to the first beam end 116. The second end support 114 may be directly or indirectly coupled to the upper beam 108.

With reference to FIGS. 1, 2, 3, and 4, the holding fixture assembly 102 is configured to position the stringer 12 and the fuselage skin 10 between the upper beam 108 and the lower beam 110 and includes a first ring 120 and a second ring 122 collectively configured to hold at least a portion of the fuselage skin 10. The fuselage skin 10 and/or the stringer 12 may be wholly or partly made of a thermoset material and/or a thermoplastic material. The first ring 120 and the second ring 122 are rotatable relative to the first end support 112 and the second end support 114, respectively, about an axis of rotation 137 to rotate the fuselage skin 10 relative to the upper beam 108 and the lower beam 110. The joining system 100 further includes one or more electric motors 124, such as servo motors, coupled to each of the first ring 120 and the second ring 122 to rotate the first ring 120 and the second ring about 122 the axis of rotation 137. One or more rotation mechanisms 126, such as gear boxes, pinion gears, rack and pinion gears, interconnect the first ring 120 and the second ring 122 and the electric motors 124 to transfer torque from the electric motor 124 to the first ring 120 and the second ring 122. Accordingly, each rotation mechanism 126 is configured to transfer torque from one or more electric motor 124 to either the first ring 120 or the second ring 122 to rotate either the first ring 120 or the second ring 122 about the axis of rotation 137. During operation, the first ring 120 and the second ring 122 rotate upon actuation of the electric motors 124 to rotate the fuselage skin 10 supported by the first ring 120 and the second ring 122. The first ring 120 and the second ring 122 are configured to rotate in unison. To do so, the holding fixture assembly 102 includes one or more longitudinal members 121 (e.g., lateral beams) connecting the first ring 120 to the second ring 122. The longitudinal members 121 hold the fuselage skin 10 in an approximately nominal condition. Aside from the longitudinal members 121, the holding fixture assembly 102 includes a plurality of cradles 123 coupled to the first ring 120 and the second ring 122. Each cradle 123 may include one or more rollers 125 in contact with either the first ring 120 or the second ring 122 to allow rotation of the first ring 120 and the second ring 122 about the axis of rotation 137. The holding fixture assembly 102 further includes one or more columns 127 each supporting one of the cradles 123.

With continued reference to FIGS. 1, 2, 3, and 4, the joining system 100 further includes a controller 128 in communication with the electric motors 124, the upper beam assembly 104, and the lower beam assembly 106. The controller 128 includes at least one processor and a non-transitory computer readable storage device or media. The processor may be a custom-made processor, a central processing unit (CPU), an auxiliary processor among several processors associated with the controller 128, a semiconductor-based microprocessor (in the form of a microchip or chip set), a macroprocessor, a combination thereof, or generally a device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 128. The joining system 100 may include one or more human-machine interfaces (HMI) 130, such as a display, a touchscreen, a keyboard, a mouse, among others, in communication with the controller 128. The HMI 130 allows an operator O to receive information from or input commands to the controller 128.

Figure 5:
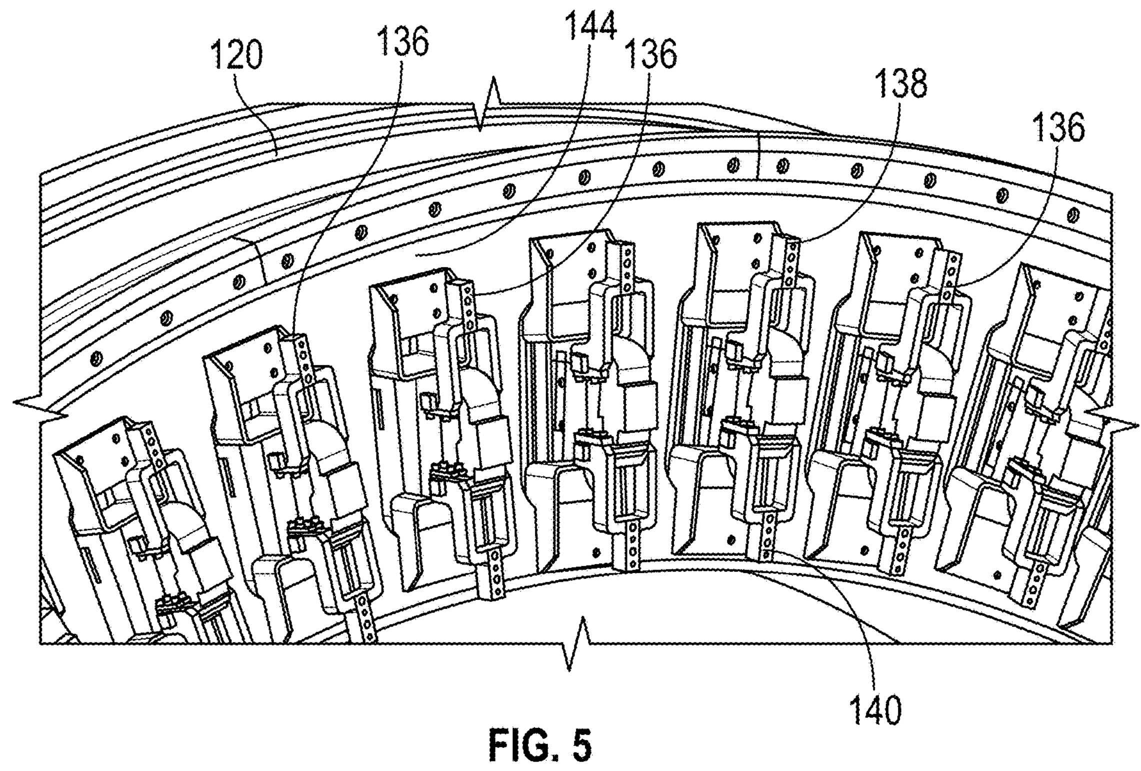
FIG. 5 is a schematic, perspective front view of a ring of the joining system of FIG. 1, showing clamps in an open configuration.
Figure 6:
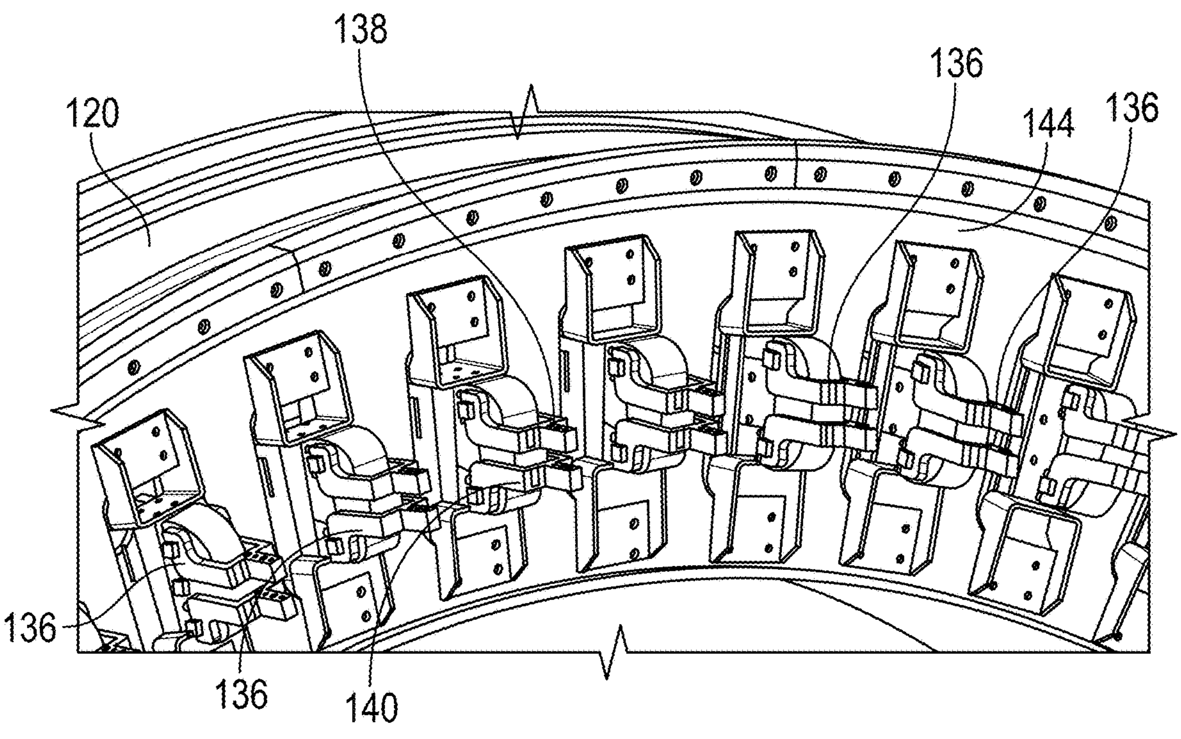
FIG. 6 is a schematic, perspective front view of the ring of FIG. 5, showing the clamps in a closed configuration.

With reference to FIGS. 5 and 6, the holding fixture assembly 102 includes a plurality of clamps 136 coupled to first ring 120 and the second ring 122 (FIG. 1). Specifically, the clamps 136 are directly connected to an inner ring surface 144 to hold the fuselage skin 10 (FIG. 2) hold its shape, thereby facilitating rotation of the fuselage skin 10. In the depicted embodiment, each clamp 136 includes two jaws (i.e., a first jaw 138 and a second jaw 140). However, it is contemplated that the clamps 136 may include a single jaw. In a single jaw configuration, the jaw would contact on the outboard side of fuselage skin 10 to provide clearance to load and unload the fuselage skin 10, while the inboard side of the fuselage skin 10 would interface with index pads.

Figure 7:
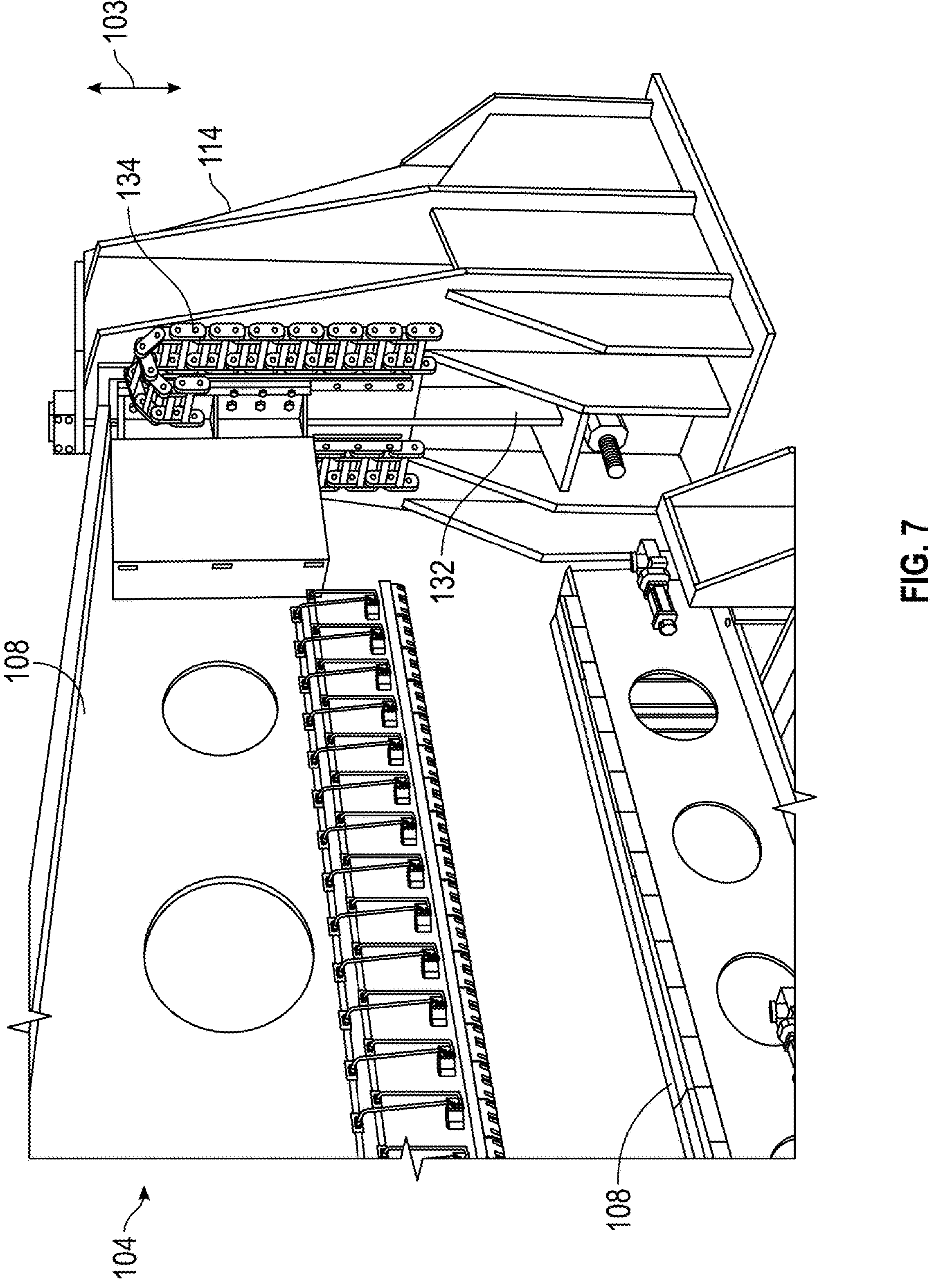
FIG. 7 is a schematic, perspective view of a portion of the upper beam assembly, a lower beam assembly, and a support of the joining system of FIG. 1.

With reference to FIG. 7, the upper beam 108 is attached to the first end support 112 (FIG. 1) and the second end support 114. Each of the first end support 112 (FIG. 1) and the second end support 114 includes a guide 132 and a mechanical linear actuator 134 to move the upper beam 108 in a vertical direction, as shown by double arrows 103, relative to the lower beam 110. The mechanical linear actuator 134 may be or include at least one of rails, a motor, a gearbox, an acme screw, a ball screw, or a combination thereof. The mechanical linear actuator 134 is therefore configured to move the upper beam 108 linearly toward or away from the lower beam 110 to clamp the fuselage skin 10 between the lower beam 110 and the upper beam 108.

Figure 9:
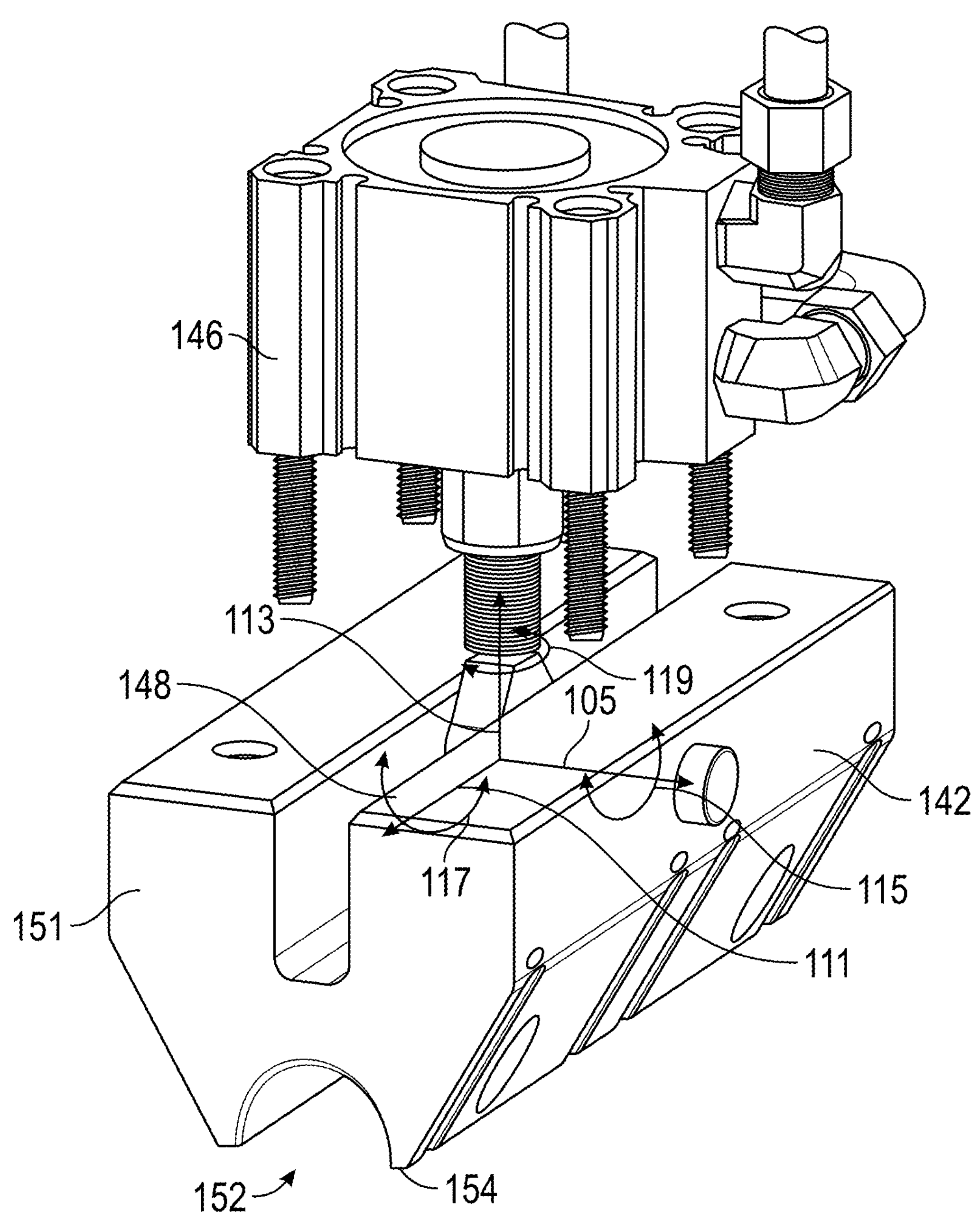
FIG. 9 is a schematic perspective view of a pressure foot of the joining system of FIG. 1.

With reference to FIGS. 8 and 9, the upper beam assembly 104 includes a plurality of pressure feet 142 movably coupled to the upper beam 108. Each of the plurality of pressure feet 142 is configured to apply pressure to the fuselage skin 10 and at least one of the plurality of stringers 12. The upper beam assembly 104 further includes a plurality of actuators 146 each coupled to the upper beam 108 and a respective one of the plurality of pressure feet 142. Upon actuation of the actuator 146, one or more of the pressure feet 142 moves relative to the upper beam 108 and the lower beam 110. Specifically, upon actuation of the actuator 146, one or more pressure feet 142 moves toward the lower beam 110. Upon deactivation of the actuator 146, one or more pressure feet 142 moves away from the lower beam 110. The controller 128 is programmed to actuate and deactivate the plurality of actuators 146.

The upper beam assembly 104 further includes a plurality of mechanical articulating joints 148, such as heim joints, each coupled between a respective one of the plurality of actuators 146 (e.g., pneumatic cylinders, hydraulic cylinders, servo motors, etc.) and the respective one of the plurality of pressure feet 142. A joint coordinate system is defined at each mechanical articulating joint 148, which includes a first joint axis 105, a second joint axis 111, and a third joint axis 113. The first joint axis 105 is perpendicular to the second joint axis 111, and the third joint axis 113 is perpendicular to the first joint axis 105 and the second joint axis 111. The mechanical articulating joint 148 is configured to rotate about the first joint axis 105 in a first rotational direction 115, about the second joint axis 111 in a second rotational direction 117, and about a third joint axis 113 in a third rotational direction 119, thereby allowing the pressure feet 142 to conform to the shape of the stringer 12 and the fuselage skin 10. Each of the plurality of pressure feet 142 includes a foot body 151 wholly or partly made of a substantially rigid material to apply the pressure necessary to join the stringer 12 to the fuselage skin 10 while minimizing deflection of the stringer 12 and the fuselage skin 10. Each of the plurality of pressure feet 142 defines a bladder cavity 152 extending through part of the foot body 151. For example, the bladder cavity 152 may be positioned along a bottom body edge 154 of the foot body 151. Regardless of its position, the bladder cavity 152 is shaped, sized, and conjured to receive at least part of an inflatable bladder 156 (FIG. 11), thereby allowing the inflatable bladder 156 to be coupled to one or more of the plurality of pressure feet 142.

Figure 10:
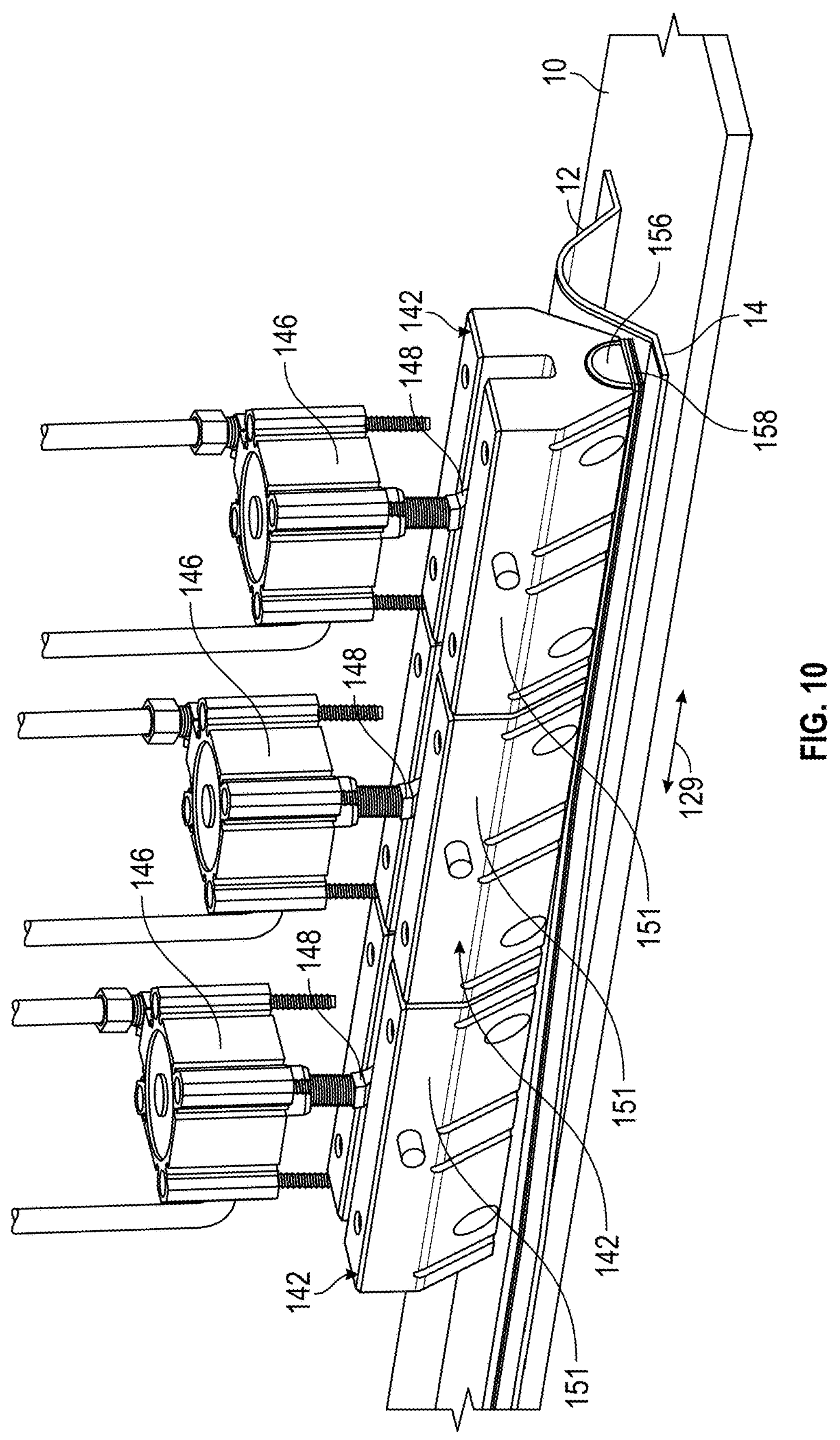
FIG. 10 is a perspective view of a plurality of pressure feet of the joining system of FIG. 1, wherein the pressure feet are applying pressure to the fuselage skin and the stringer
Figure 11:
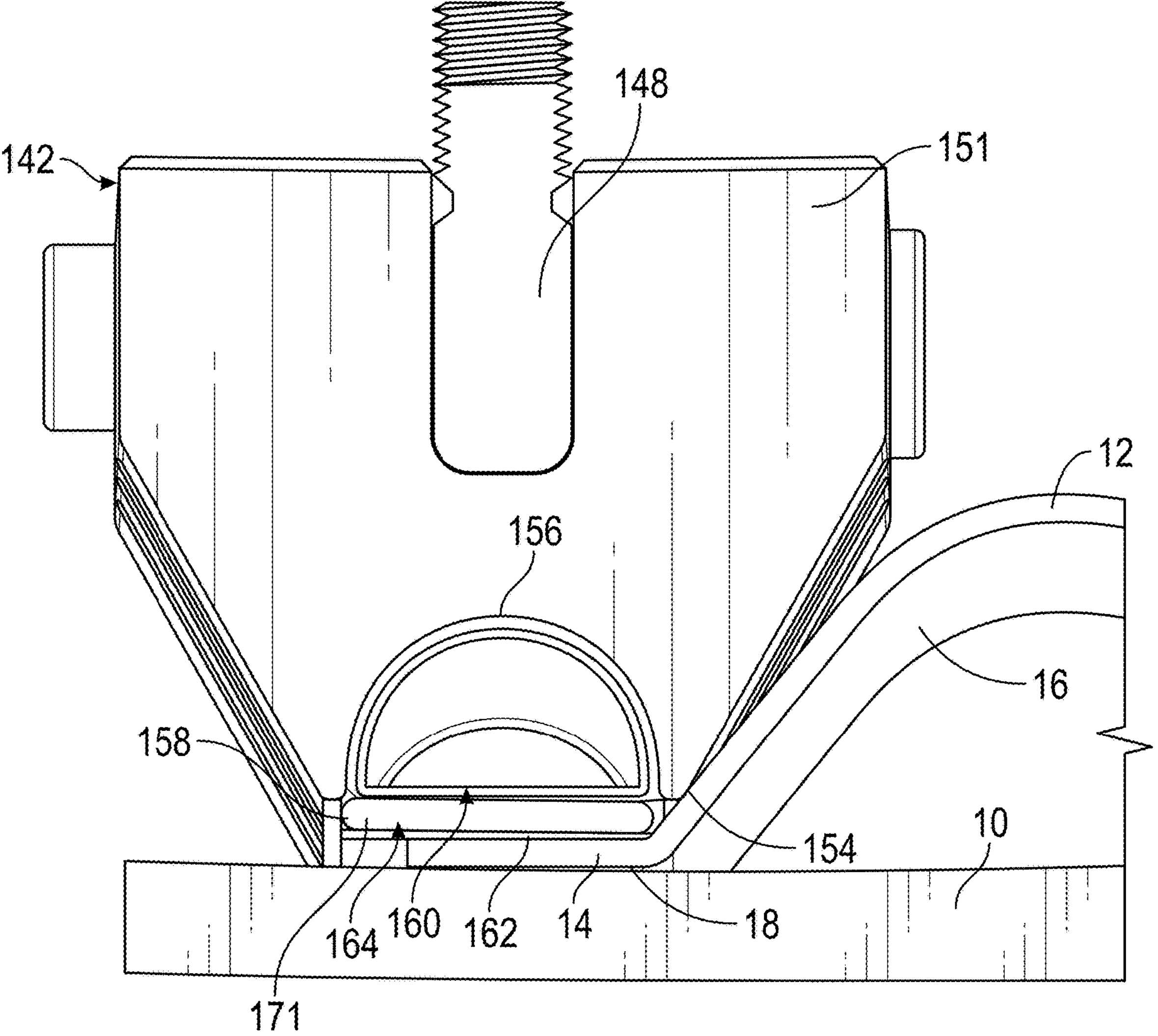
FIG. 11 is a cross-sectional front view of a pressure foot of the lower beam assembly of the joining system of FIG. 1.

With reference to FIGS. 10 and 11, the inflatable bladder 156 may be coupled to multiple pressure feet 142 and is configured to shift between an inflated state and a deflated state. To inflate the inflatable bladder 156, a fluid is pumped into the inflatable bladder 156. To deflate the inflatable bladder 156, a vacuum may be connected to the inflatable bladder 156 to deflate the inflatable bladder 156. The controller 128 is programmed to pressurize the inflatable bladder 156. It is envisioned that the inflatable bladder 156 may be coupled to solely one of the pressure feet 142. The bladder cavity 152 may be aligned to receive the inflatable bladder 156 in a longitudinal direction 129. The upper beam 108, the lower beam 110, and the inflatable bladder 156 are each elongated along the longitudinal direction 129. The longitudinal direction 129 is parallel to the first joint axis 105 (FIG. 9). The upper beam assembly 104 further includes one or more upper heating elements 158 directly or indirectly coupled to the inflatable bladder 156. For instance, the upper heating element 158 may be directly coupled to the inflatable bladder 156 at a lower bladder surface 160 of the inflatable bladder 156. The upper heating element 158 may produce heat through electric resistance, electromagnetic induction (e.g., a susceptor with a custom cure point), fluid system (e.g., inert gas or high temperature liquid), or a combination thereof. The upper heating elements 158 may be configured as welders 171. The controller 128 is programmed to regulate the application of heat by the upper heating element. 158.

With continued reference to FIGS. 10 and 11, the upper beam assembly 104 may further include a contact shim 162 directly or indirectly coupled to the upper heating element 158. The contact shim 162 is wholly or partly made of a thermally conductive material to allow heat transfer from the upper heating element 158 to the stringer 12. Further, the contact shim 162 may be directly connected to the upper heating element 158 at a lower element surface 164 of the upper heating element 158 to protect the upper heating element 158 when the upper beam assembly 104 applies pressure on the fuselage skin 10. The contact shim 162 is configured to directly contact a flange 14 of the stringer 12 to apply pressure to the stringer 12. The stringer 12 includes a stringer body 16 that may have a curved shape. The flange 14 has a planar shape and extends from the stringer body 16. The upper heating element 158 is configured to apply heat to the fuselage skin 10 and one or more stringers 12 to melt a thermoplastic film 18 disposed between the fuselage skin 10 and the flange 14 of the stringer 12 to bond the stringer 12 to the fuselage skin 10. The thermoplastic film 18 is used to bond (e.g., weld) the stringer 12 to the fuselage skin 10, particularly when either the stringer 12 of the fuselage skin 10 is wholly or partly made of a thermoset material. During operation, the pressure feet 142 are configured to compress the stringer 12 and the fuselage skin 10 together using the inflatable bladder 156 prior to and during the conductive thermoplastic welding, which may be achieved through conductive heating.

Figure 12:
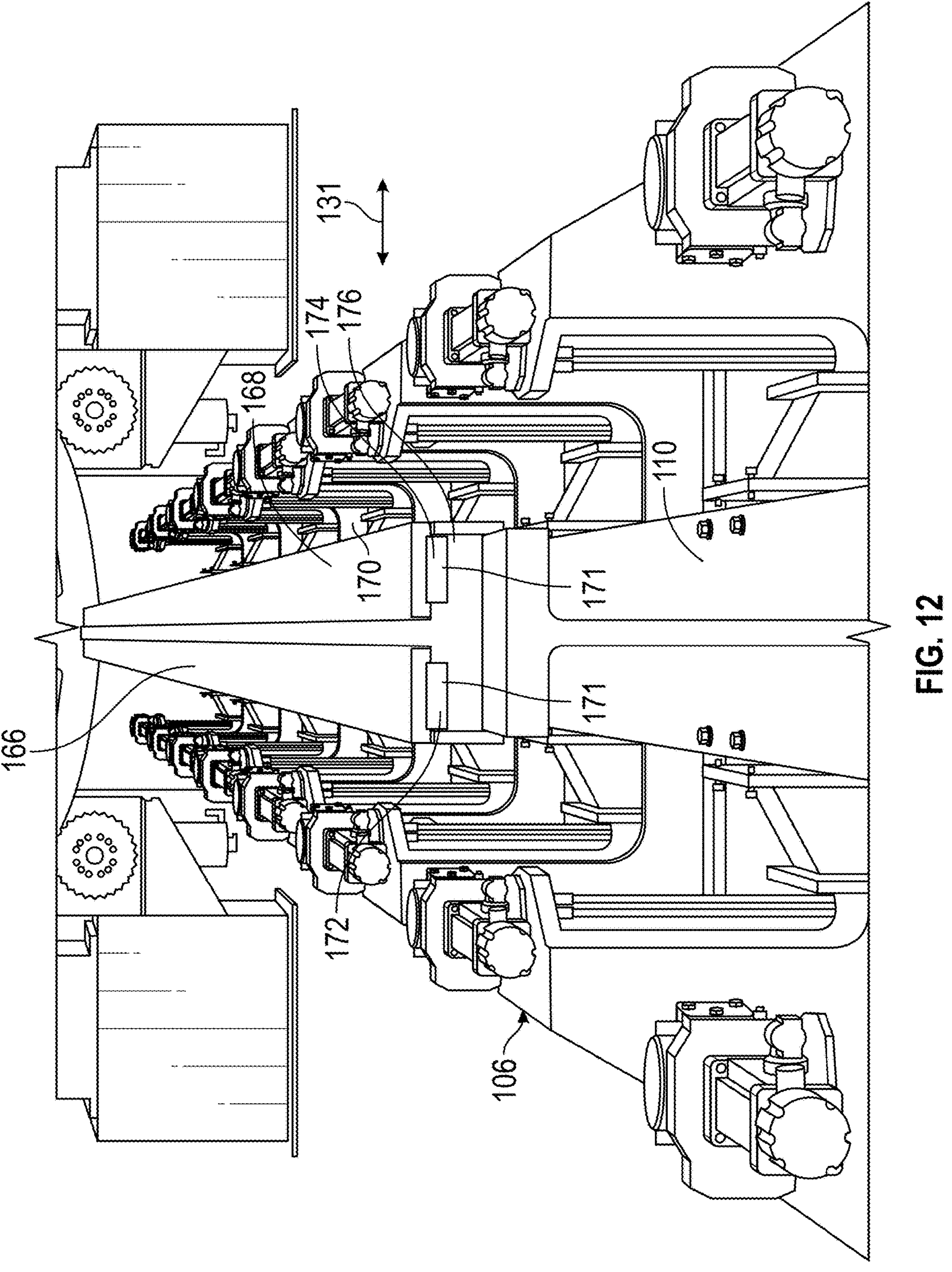
FIG. 12 is a schematic, front view of a portion of the joining system of FIG. 1, showing the lower beam assembly.

With reference to FIG. 12, the lower beam assembly 106 includes a first platen plate 166 and a second platen plate 168 disposed on the lower beam 110. The first platen plate 166 and the second platen plate 168 contact and support the fuselage skin 10 in a nominal shape. The first platen plate 166 is spaced apart from the second platen plate along a transverse direction 131. The transverse direction 131 is perpendicular to the longitudinal direction 129 (FIG. 10). Each of the first platen plate 166 and the second platen plate 168 is configured to directly contact the fuselage skin 10 (FIG. 8) to facilitate bonding the fuselage skin 10 to the stringer 12.

With continued reference to FIG. 12, the lower beam assembly 106 includes one or more lower heating element assemblies 170. In the depicted embodiment, the lower heating element assembly 170 includes a first heating element 172 and a second heating element 174 to facilitate bonding the fuselage skin 10 to the stringer 12 (FIG. 8). Each of the first heating element 172 and the second heating element 174 may be referred to as a lower heating element and may be configured as a welder 171. Due to its shape and configuration, each of the first heating element 172 and the second heating element 174 is configured to weld an entirety of at least one of the flanges 14 of the stringer 12 all at once to the fuselage skin 10. While the depicted embodiment shows the first heating element 172 and the second heating element 174, it is contemplated that the lower beam assembly 106 may include more or fewer heating elements. The first heating element 172 is disposed under the first platen plate 166 and may be in direct contact with the first platen plate 166 to facilitate heat transfer from the first heating element 172 to the first platen plate 166. The second heating element 174 is disposed under the second platen plate 168. The second heating element 174 is in direct contact with the second platen plate 168 to facilitate heat transfer from the second heating element 174 to the second platen plate 168. The first heating element 172 and the second heating element 174 may be configured as heater blocks and have internal cartridge style heaters. In some embodiments, the first heating element 172 and the second heating element 174 may produce heat through electric resistance, electromagnetic induction (e.g., susceptor with custom curie point), fluid systems (e.g., inert gas or high temperature liquid) or a combination thereof. The lower beam assembly 106 further includes a thermally insulative block 176 at least partially disposed under the first heating element 172 and the second heating element 174 to hinder heat transfer from the first heating element 172 and the second heating element 174 to the lower beam 110. For the same reason, the thermally insulative block 176 is disposed on the lower beam 110. Thermocouples may be embedded in the first platen plate 166, the second platen plate 168, the first heating element 172, the second heating element 174, or a combination thereof. The controller 128 is programmed to regulate the application of heat by the first heating element 172 and the second heating element 174.

Figure 13:
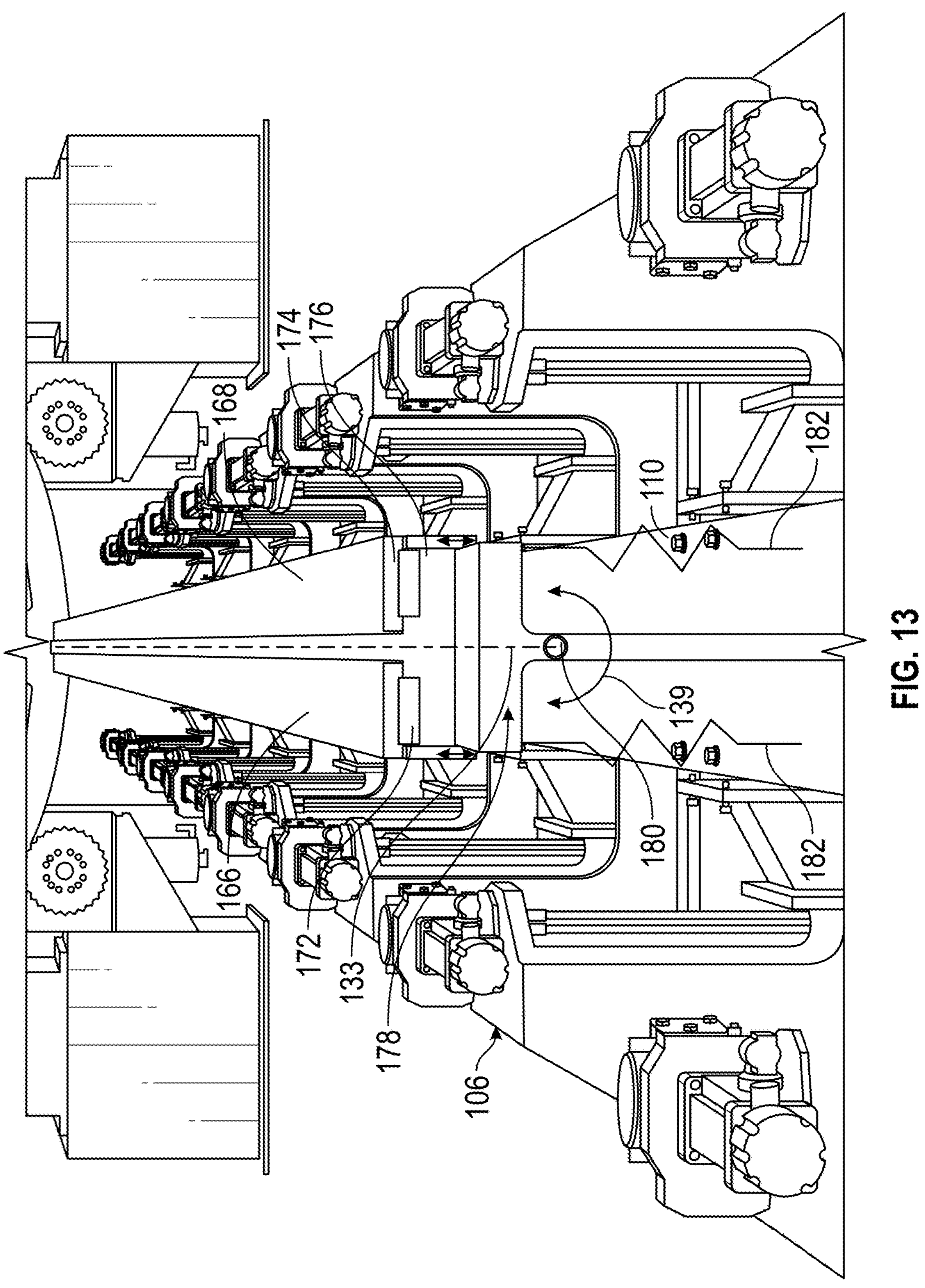
FIG. 13 is a schematic, front view of a portion of the joining system of FIG. 1, showing the lower beam assembly with a gimbal.

With reference to FIG. 13, the lower beam assembly 106 includes a gimbal 178 for maintaining the fuselage skin 10 in a nominal position. The gimbal 178 includes a pivot joint 180 (i.e., pivot point) coupled to the lower beam 110. The pivot joint 180 allows the first platen plate 166 and the second platen plate 168 to pivot about a centerline 133 in a fourth rotational direction 139, thereby ensuring that the first platen plate 166 and the second platen plate 168 contact the outer surface of the fuselage skin 10 that does not have a constant radius. The centerline 133 extends along the thermally insulative block 176 between the first platen plate 166 and the second platen plate 168. The gimbal 178 also includes one or more biasing members 182, such as springs, coupled to the lower beam 110 to maintain the fuselage skin 10 in a neutral position. The gimbal 178 may also include servo motors configured to rotate the lower beam to a predetermined position for one particular stringer 12.

Figure 14:
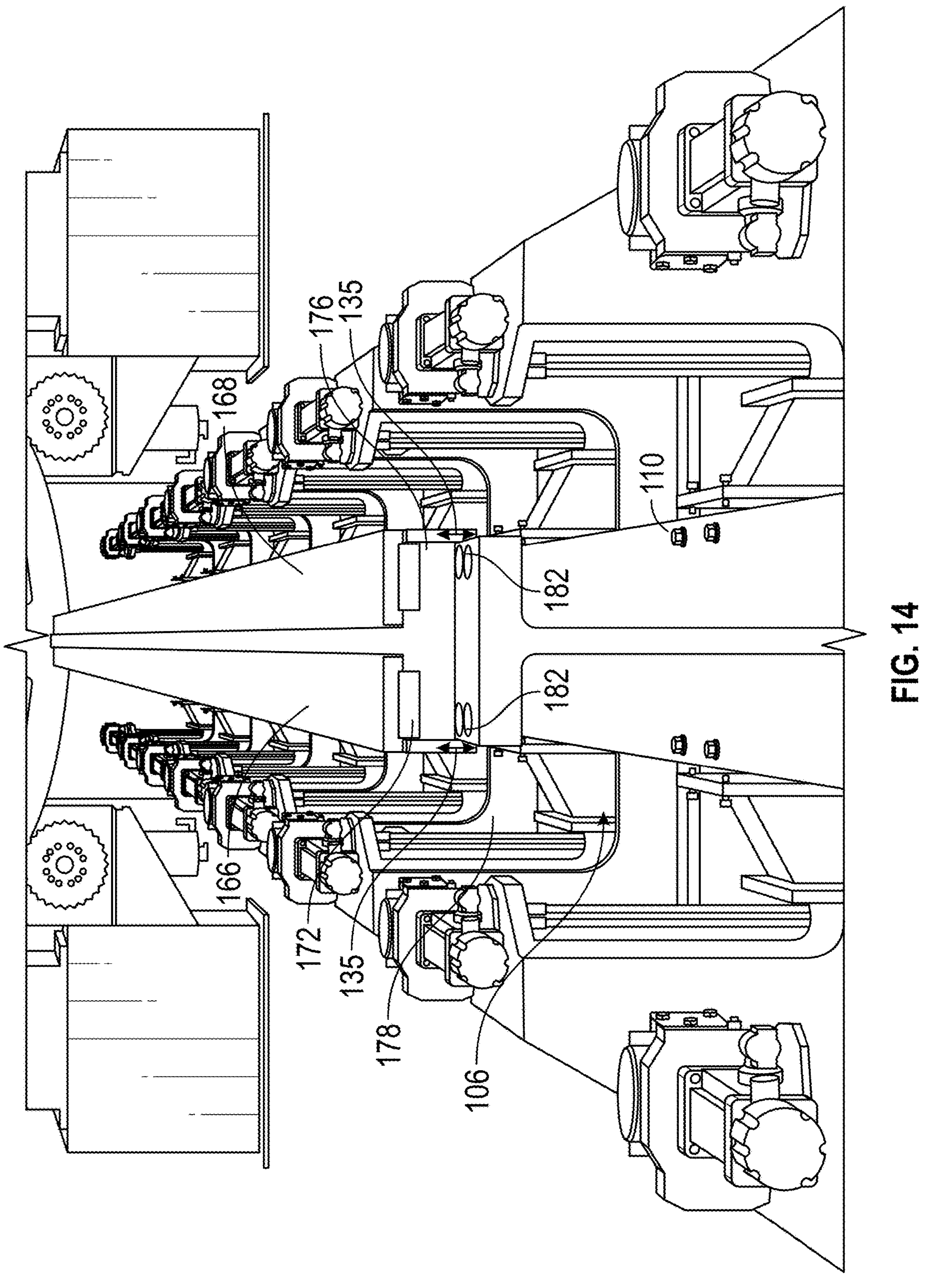
FIG. 14 is a schematic, front view of a portion of the joining system of FIG. 1, showing the lower beam assembly with a gimbal in accordance with another aspect of the present disclosure.

FIG. 14 shows the lower beam assembly 106 with a gimbal 178 in accordance with another aspect of the present disclosure. In this gimbal 178, the thermally insulative block 176, the first platen plate 166, the second platen plate 168, the first heating element 172, and the second heating element 174 are mounted to the lower beam 110 through a plurality of biasing members 182, such as washers. Specifically, the biasing members 182 are coupled between the lower beam 110 and the thermally insulative block 176 to permit relative movement 135 (e.g., vertical movement) of the thermally insulative block 176 relative to the lower beam 110. The biasing members 182 permit a predetermined amount of vertical movement, thereby allowing a limited amount of rotation by the first heating element 172 and the second heating element 174.

Figure 15:
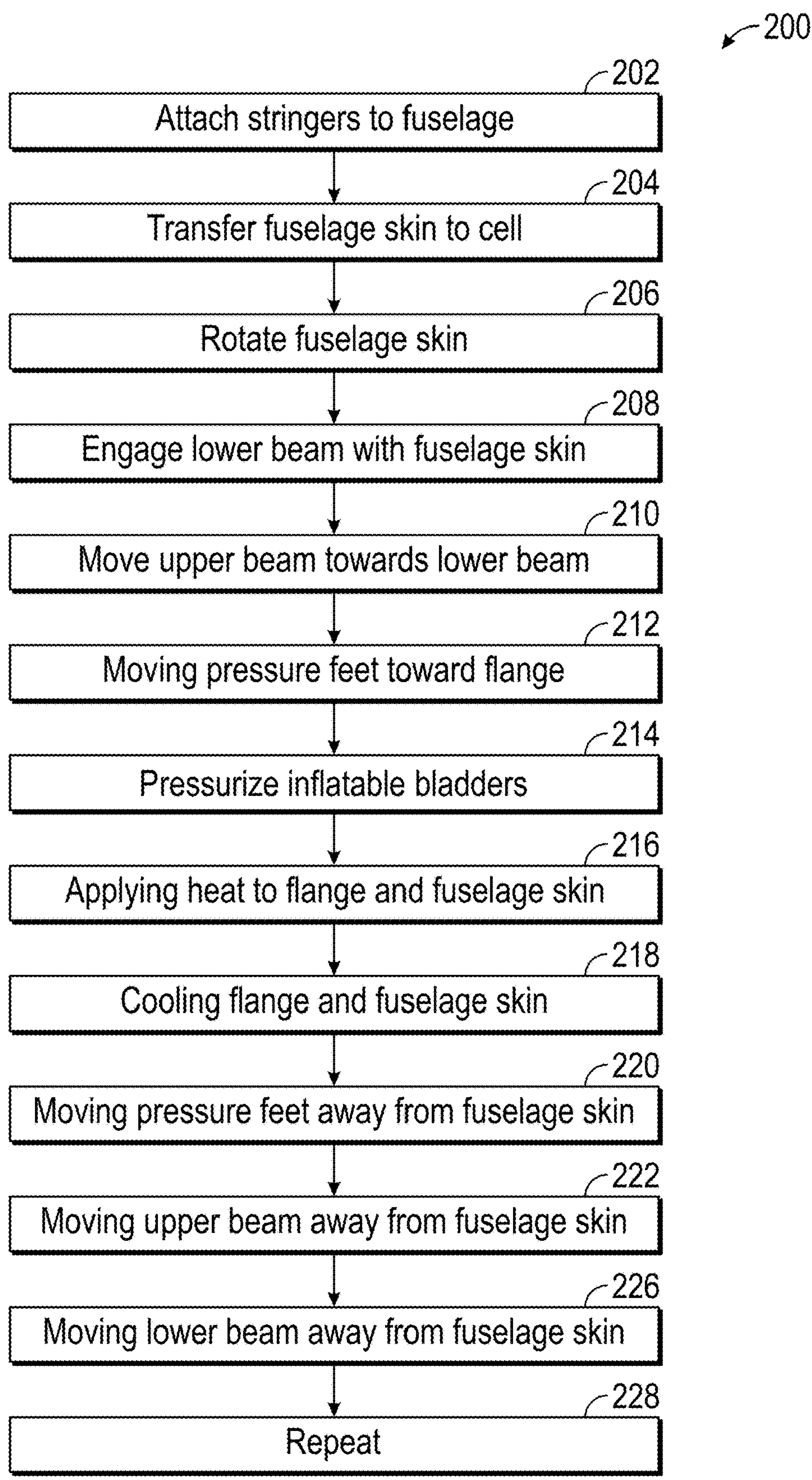
FIG. 15 is a flowchart of a method for bonding stringers to a fuselage skin.

FIG. 15 is a flowchart of a method 200 for bonding stringers 12 to the fuselage skin 10. The method 200 may be referred to as a conductive thermoplastic welding method and begins at block 202, which entails temporarily attaching stringers 12 to the fuselage skin 10. Temporary fasteners 173 (FIG. 8), such as thermoplastic rivets, may be used to temporarily attach the stringers 12 to the fuselage skin 10. In particular, the temporary fasteners 173 (FIG. 8), such as thermoplastic rivets, may be inserted through the stringer 12 and the fuselage skin 10 to temporarily attach the stringers 12 to the fuselage skin 10. The method 200 then proceeds to block 204. At block 204, the fuselage skin 10 and the stringers 12 are transferred to a joining cell 101 as shown in FIG. 2. At block 204, the fuselage skin 10 is also coupled to the first ring 120 and the second ring 122. To do so, the fuselage skin 10 is positioned between the first jaw 138 and the second jaw 140 of at least two or more clamps 136 while the clamps 136 are in the open configuration. Then, the clamps 136 are shifted from the open configuration to the closed configuration to secure the fuselage skin 10 to the first ring 120 and the second ring 122. Once the fuselage skin 10 is secured to the first ring 120 and the second ring 122, the method 200 proceeds to block 206.

Figure 16:
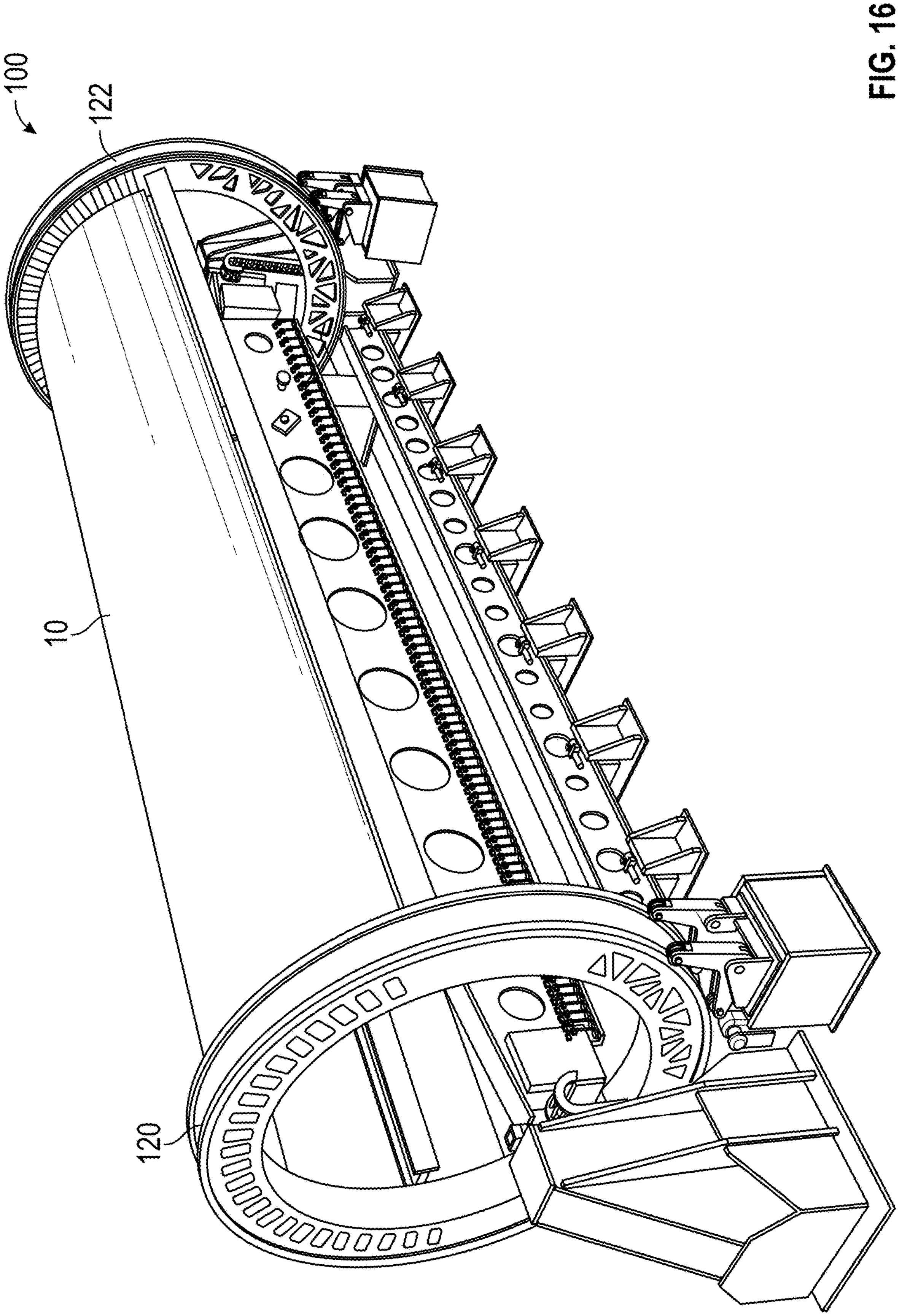
FIG. 16 is a schematic, perspective view of the joining system, showing the fuselage skin being rotated.
Figure 17:
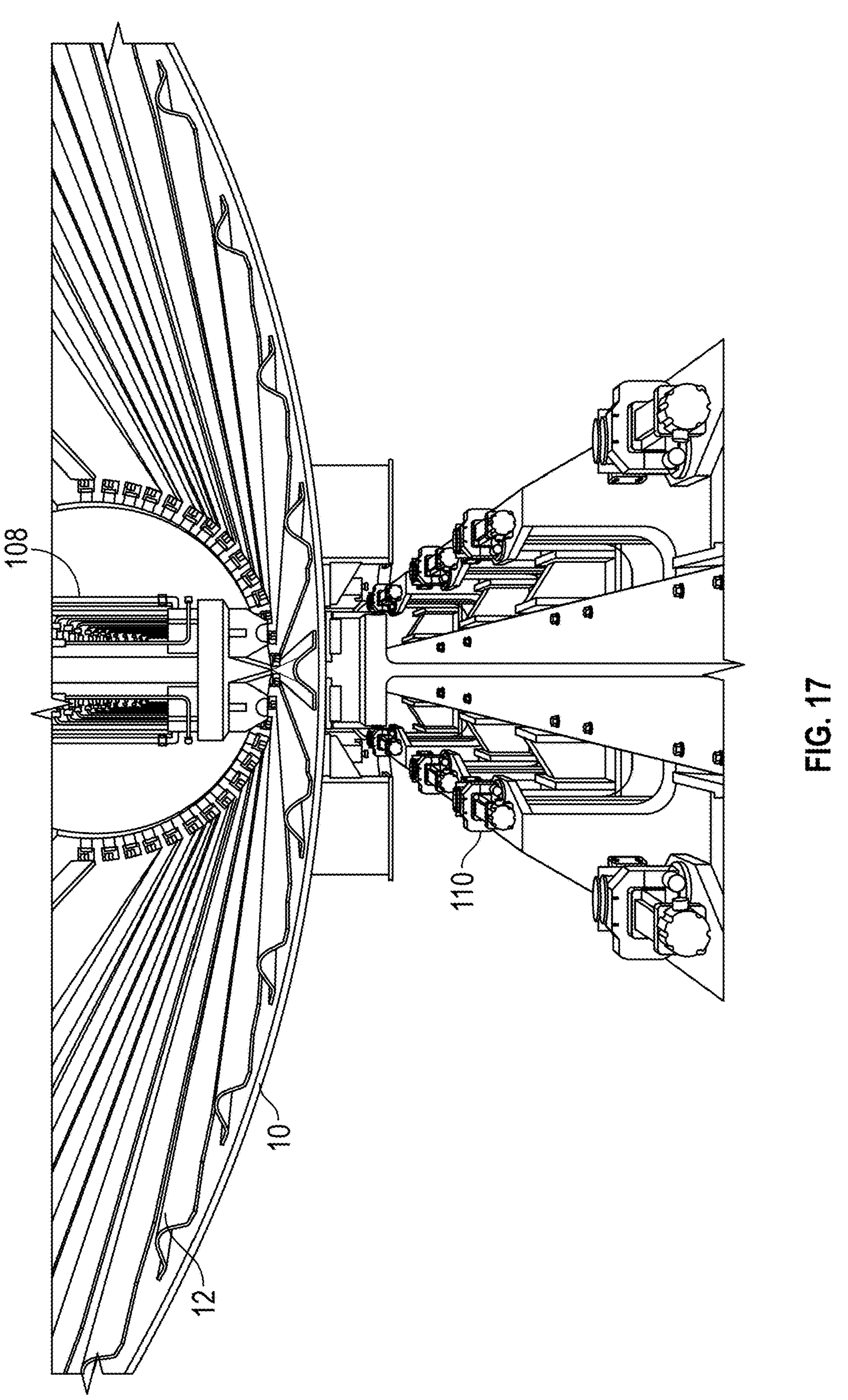
FIG. 17 is a sectional, front view of the joining system, showing the lower beam in contact with the fuselage skin.

With continued reference to FIG. 15, at block 206, the first ring 120 and the second ring 122 are rotated to rotate the fuselage skin 10 along with the stringers 12 as shown in FIG. 16. The fuselage skin 10 is rotated until at least one of the stringers 12 is located between the upper beam 108 and the lower beam 110. See e.g., FIG. 8. Then, the method 200 continues to block 208. At block 208, the lower beam assembly 106 is engaged with the fuselage skin 10. To do so, the lower beam 110 is moved upwardly toward the fuselage skin 10 until the lower beam 110 contacts the fuselage skin 10 as shown in FIG. 17. Next, the method 200 continues to block 210.

With continued reference to FIG. 15, at block 210, the upper beam 108 is moved toward the lower beam 110 toward the flange 14 of one of the stringers 12 until the pressure feet 142 are proximate the flange 14 to clamp the stringer 12 and the fuselage skin 10 together. As a non-limiting example, the upper beam 108 may be moved toward the lower beam 110 the flange 14 of one of the stringers 12 until the pressure feet 142 are about 0.25 inches away from the flange 14. Then, the method 200 proceeds to block 212. At block 212, the pressure feet 142 are moved toward the flange 14 of the stringer 12. To do so, the actuators 146 are activated, thereby causing the pressure feet 142 to move toward the flange 14 of the stringer 12. Next, the method 200 proceeds to block 214.

With continued reference to FIG. 15, at block 214, the inflatable bladders 156 are pressurized to clamp the flange 14 of the stringer 12 and the fuselage skin 10 together. To do so, a pressure source may be attached to the inflatable bladder 156 to inflate the inflatable bladder 156. Upon inflation, the inflatable bladders 156 apply pressure to the stringer 12, thereby clamping the stringer 12 and the fuselage skin 10 together as shown in FIG. 10. At block 214, the inflatable bladders 156 may be fully inflated with air. The method 200 then proceeds to block 216.

With continued reference to FIG. 15, at block 216, the heat is applied to the flange 14 of the stringer 12 and the fuselage skin 10 in accordance with a predetermined heating plan to heat (e.g., melt) the thermoplastic film 18 (FIG. 11) that is disposed between the fuselage skin 10 and the flange 14 of the stringer 12 to bond (e.g., weld) the stringer 12 to the fuselage skin 10 while pressure is applied to the stringer 12 to clamp the stringer 12 and the fuselage skin 10 together. Heating (e.g., melting) the thermoplastic film 18 is particularly useful to weld the stringer 12 to the fuselage skin 10 when the stringer 12 and/or the fuselage skin 10 is wholly or partly made of a thermoset material To melt the thermoplastic film 18, the upper heating elements 158 and the lower heating element assembly 170 may be activated to apply heat to the stringer 12 and the fuselage skin 10 in accordance with the predetermined heating plan. As a result, the flange 14 of the stringer 12 is welded to the fuselage skin 10 all at once. The temporary fasteners 173 (FIG. 8) may be removed from the stringer 12 after welding the flange 14 of the stringer 12 to the fuselage skin 10 all at once. In other words, welding is an entirety of the flange 14 to the fuselage skin 10 all at once could be performed prior to removing the temporary fasteners 173. The stringer 12 may have one or more flanges 14. For this reason, the entirety of one or more flanges 14 is welded to the fuselage skin 10 all at once. For example, a single flange 14 of the stringer 12 may be welded to the fuselage skin 10 all at once. Thus, welding entails joining the fuselage skin 10 to only one flange 14 at at time. Alternatively, two or more flanges 14 of the stringer 12 may be welded to the fuselage skin 10 all at once. Therefore, in this case, welding entails joining the fuselage skin 10 to two or more flanges 14 at a time. The predetermined heating plan may entail a dynamic cycle, which may be controlled by the controller 128 (e.g., PID controller). This dynamic cycle may include the following steps: heat up; dwell; and cool down at a predetermined rate using a combination of heat and cooling features. To this end, the upper heating elements 158 and the lower heating element assembly 170 may include fluid heated tools that can have ported manifolds. The ported manifolds may be used to purge the fluid heated tools using multiple heating oils or compressed air sources. The heating oils or compressed air sources may be preheated and flow at very high flow rates to minimize temperature drops between the inlet and outlet of the ported manifolds while providing flexibility in terms of distributed heat applied to the stringer 12 and the fuselage skin 10. Air may be used in the inflatable bladder 156 to avoid contamination in case of a leak. Oils may be used in the upper heating elements 158 and the lower heating element assembly 170 (which may be made of hard metal) when fluid is used to heat the fuselage skin 10 and the stringer 12. Alternatively, the upper heating elements 158 and the lower heating element assembly 170 may operate at an isothermal temperature to cause crystallization of the thermoplastic film 18. This isothermal process may include a crystallization step. The fuselage skin 10 and the stringer 12 may be molded at the crystallization temperature of the thermoplastic film 18. The upper heating elements 158 and the lower heating element assembly 170 do not need to cool to a temperature that is less than the crystallization temperature of the thermoplastic film 18. After applying heat to the flange 14 of the stringer 12 and the fuselage skin 10, the method 200 proceeds to block 218. At block 218, the flange 14 of the stringer 12 and the fuselage skin 10 are cooled. This cooling process may involve dynamic cooling or quench cooling. Then, the method 200 proceeds to block 220.

With continued reference to FIG. 15, at block 220, the pressure feet 142 are moved away from the fuselage skin 10. To do so, the actuators 146 are deactivated, thereby causing the pressure feet 142 to move away from the fuselage skin 10. Next, the method 200 proceeds to block 222. At block 222, the upper beam 108 is moved away from the fuselage skin 10 to clear the fuselage skin 10 for rotation. Then, the method 200 proceeds to block 226. At block 226, the lower beam 110 is moved away from the fuselage skin 10 clear it for rotation. Next, the method 200 proceeds to block 228. At block 228, blocks 206, 208, 210, 212, 214, 216, 218, 220, 222, and 226 repeated to bond another stringer 12 to the fuselage skin 10. A portion of an aircraft may be assembled according to the method 200.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The terms "A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. A joining system, comprising:

a holding fixture assembly configured to hold a fuselage skin, wherein at least one of a plurality of stringers is temporarily attached to the fuselage skin, and each of the plurality of stringers includes at least one flange;

an upper beam assembly including an upper beam, a plurality of pressure feet coupled to the upper beam, and an inflatable bladder coupled to each of the plurality of pressure feet;

a lower beam assembly including a lower beam and at least one lower heating element, the holding fixture assembly being coupled to the upper beam assembly, and the holding fixture assembly being coupled to the lower beam assembly, and the at least one lower heating element is configured to apply heat to the at least one flange to weld the fuselage skin to the at least one flange; and wherein each of plurality of pressure feet is configured to compress the at least one of the plurality of stringers and the fuselage skin together using the inflatable bladder prior to and during the welding.

2. The joining system of claim 1, wherein each of the plurality of pressure feet defines a bladder cavity sized to receive the inflatable bladder, and the bladder cavity of each of the plurality of pressure feet is aligned to receive the inflatable bladder in a longitudinal direction.

3. The joining system of claim 2, wherein each of the upper beam, the lower beam, and the inflatable bladder is elongated along the longitudinal direction, the lower beam assembly includes a first platen plate and a second platen plate disposed on the lower beam, the first platen plate is spaced apart from the second platen plate along a transverse direction, the transverse direction is perpendicular to the longitudinal direction, and each of the first platen plate and the second platen plate is configured to directly contact the fuselage skin to facilitate bonding the fuselage skin to one of the plurality of stringers.

4. The joining system of claim 3, wherein the at least one lower heating element is configured to apply heat to the fuselage skin and the at least one of the plurality of stringers to melt a thermoplastic film disposed between the fuselage skin and the at least one of the plurality of stringers to bond the at least one of the plurality of stringers to the fuselage skin, the at least one lower heating element is a first heating element, the lower beam assembly further includes a second heating element to facilitate bonding the fuselage skin to one of the plurality of stringers, the first heating element is disposed under the first platen plate, the first heating element is in direct contact with the first platen plate to facilitate heat transfer from the first heating element to the first platen plate, the second heating element is disposed under the second platen plate, and the second heating element is in direct contact with the second platen plate to facilitate heat transfer from the second heating element to the second platen plate.

5. The joining system of claim 4, wherein the lower beam assembly includes a thermally insulative block at least partially disposed under the first heating element and the second heating element to hinder heat transfer from the first heating element and the second heating element to the lower beam, and the thermally insulative block is disposed on the lower beam.

6. The joining system of claim 5, wherein the upper beam assembly further comprises an upper heating element coupled to the upper beam, and the upper heating element is disposed between the inflatable bladder and the at least one flange of the at least one of the plurality of stringers to facilitate bonding the at least one of the plurality of stringers to the fuselage skin.

7. The joining system of claim 6, further comprising a first ring and a second ring collectively configured to hold at least a portion of the fuselage skin, wherein the first ring and the second ring are rotatable relative to a first end support and a second end support, respectively, about an axis of rotation to rotate the fuselage skin relative to the upper beam and the lower beam, and the joining system further comprises servo motors coupled to the first ring and the second ring to rotate the first ring and the second ring about the axis of rotation.

8. The joining system of claim 7, wherein each of the first ring and the second ring includes a plurality of clamps, and each of the plurality of clamps has a closed configuration to hold the fuselage skin and an open configuration to release the fuselage skin.

9. The joining system of claim 8, wherein the lower beam assembly further includes a gimbal supporting the lower beam, and the lower beam assembly further includes at least one biasing member coupled to the lower beam to maintain the lower beam in a neutral position.

10. The joining system of claim 9, wherein the at least one biasing member coupled between the lower beam and the thermally insulative block to permit relative movement of the thermally insulative block relative to the lower beam.

11. The joining system of claim 1, wherein the upper beam assembly further includes a plurality of actuators each coupled to the upper beam and a respective one of the plurality of pressure feet, and each of the plurality of pressure feet is movable relative to the lower beam upon actuation of the plurality of actuators.

12. The joining system of claim 11, further comprising a controller programmed to actuate the plurality of actuators, pressurize the inflatable bladder, and regulate heat applied by the at least one lower heating element.

13. The joining system of claim 1, further comprising a first end support and a second end support, the upper beam includes a first beam end and a second beam end opposite the first beam end, the first end support is coupled at the first beam end, the second end support is coupled at the upper beam, and each of the first end support and the second end support includes a guide and a mechanical linear actuator to move the upper beam in a vertical direction relative to the lower beam.

14. The joining system of claim 1, wherein the lower beam assembly comprises at least one thermally insulative block disposed on the lower beam, at least one lower heating element disposed on the at least one thermally insulative block, a plurality of platen plates disposed on the at least one lower heating element, the lower beam assembly further comprises a pivot point on the lower beam, the at least one lower heating element and the plurality of platen plates are attached to the pivot point to provide a rotational axis, thereby allowing the at least one lower heating element and the plurality of platen plates to remain approximately normal to a surface of the fuselage skin.

15. The joining system of claim 1, wherein the holding fixture assembly comprises a plurality of rings and a plurality of longitudinal members coupled to the plurality of rings, wherein the plurality of rings and the plurality of longitudinal members hold the fuselage skin.

16. The joining system of claim 1, wherein the lower beam assembly comprises at least one thermally insulative block disposed on the lower beam, and the at least one lower heating element is disposed on the at least one thermally insulative block.

17. A joining system, comprising:

a holding fixture assembly configured to hold a fuselage skin, wherein at least one of a plurality of stringers is temporarily attached to the fuselage skin, and each of the plurality of stringers includes at least one flange;

an upper beam assembly including an upper beam, a plurality of pressure feet coupled to the upper beam, and an inflatable bladder coupled to each of the plurality of pressure feet;

wherein the upper beam assembly includes a contact shim disposed between the inflatable bladder and the at least one flange of one of the plurality of stringers;

a lower beam assembly including a lower beam and at least one lower heating element, the holding fixture assembly being coupled to the upper beam assembly, and the holding fixture assembly being coupled to the lower beam assembly, and the at least one lower heating element is configured to apply heat to the at least one flange to weld the fuselage skin to the at least one flange; and wherein the upper beam is movable relative to the lower beam to clamp the at least one of the plurality of stringers and the fuselage skin together prior to and during welding.

18. A joining system, comprising:

a plurality of rings and a plurality of longitudinal members arranged to support a fuselage skin;

an upper beam extending along a longitudinal direction;

a plurality of pressure feet movably coupled to the upper beam;

an inflatable bladder associated with the plurality of pressure feet and inflatable to apply distributed pressure;

a plurality of actuators coupled to the plurality of pressure feet;

a lower beam extending along the longitudinal direction;

at least one heating element supported by the lower beam; and a controller electrically connected to the plurality of actuators, the inflatable bladder, and the at least one heating element, wherein movement of the upper beam toward the lower beam urges the plurality of pressure feet and the inflatable bladder against at least one flange of a stringer positioned on the fuselage skin;

wherein the inflatable bladder is pressurized to compress the at least one flange between the plurality of pressure feet and the lower beam; and wherein the at least one heating element applies heat to the at least one flange while the at least one flange is compressed.

19. The joining system of claim 18, wherein:

the lower beam includes a pivot joint coupling the at least one heating element to the lower beam; and at least one spring is coupled between the lower beam and the at least one heating element.

20. The joining system of claim 18, further comprising:

a first platen plate and a second platen plate supported on the lower beam and spaced apart in a transverse direction;

a thermally insulative block disposed between the at least one heating element and the lower beam; and a second heating element positioned beneath one of the first platen plate and the second platen plate.

* * * * *